(12) United States Patent
Kumarasamy et al.

(10) Patent No.: US 12,075,163 B2
(45) Date of Patent: Aug. 27, 2024

(54) DYNAMIC CAMERA FIELD OF VIEW ADJUSTMENT

(71) Applicant: Apple Inc., Cupertino, CA (US)

(72) Inventors: Kartthik Kumarasamy, Cupertino, CA (US); Bohan Hao, Santa Clara, CA (US); Angelo M. Alaimo, San Jose, CA (US)

(73) Assignee: APPLE INC., Cupertino, CA (US)

( * ) Notice: Subject to any disclaimer, the term of this patent is extended or adjusted under 35 U.S.C. 154(b) by 45 days.

(21) Appl. No.: 17/880,905

(22) Filed: Aug. 4, 2022

(65) Prior Publication Data
US 2024/0048847 A1 Feb. 8, 2024

(51) Int. Cl.
*H04N 23/69* (2023.01)
*H04N 23/663* (2023.01)
*H04N 23/68* (2023.01)
*H04N 23/695* (2023.01)
*H04N 23/80* (2023.01)

(52) U.S. Cl.
CPC .......... *H04N 23/69* (2023.01); *H04N 23/663* (2023.01); *H04N 23/682* (2023.01); *H04N 23/695* (2023.01); *H04N 23/80* (2023.01)

(58) Field of Classification Search
CPC .... H04N 23/69; H04N 23/663; H04N 23/682; H04N 23/695; H04N 23/80
See application file for complete search history.

(56) References Cited

U.S. PATENT DOCUMENTS

| | | | | |
|---|---|---|---|---|
| 8,089,518 B2* | 1/2012 | Fahn | ........................ | G01S 3/7865 348/208.14 |
| 8,553,106 B2* | 10/2013 | Scarff | ...................... | H04N 23/45 348/263 |
| 9,628,717 B2* | 4/2017 | Tsubusaki | ............ | H04N 23/611 |
| 9,924,102 B2 | 3/2018 | Gervautz et al. | | |
| 9,992,421 B2 | 6/2018 | Tsubusaki | | |
| 10,075,651 B2 | 9/2018 | Laroia et al. | | |
| 10,397,484 B2 | 8/2019 | Keskin et al. | | |
| 10,819,912 B2 | 10/2020 | Jin | | |
| 11,265,474 B2 | 3/2022 | Dolgin et al. | | |
| 11,838,632 B2* | 12/2023 | Maniwa | ................ | H04N 23/685 |
| 2015/0036047 A1* | 2/2015 | Bledsoe | .................. | H04N 23/51 348/375 |
| 2017/0205619 A1* | 7/2017 | Hamada | .................. | H04N 23/56 |

FOREIGN PATENT DOCUMENTS

JP 6335520 5/2018

* cited by examiner

*Primary Examiner* — Chiawei Chen
(74) *Attorney, Agent, or Firm* — Brownstein Hyatt Farber Schreck, LLP

(57) ABSTRACT

Various embodiments disclosed herein include techniques for adjusting the lateral position of a default field of view of a camera. The camera may change the lateral position of its field of view by creating relative movement between an image sensor and a lens of the camera, and may maintain the camera's field of view to the default field of view when the camera is stationary. In some embodiments, the lateral position may be set using orientation information associated with the camera. In other embodiments, the lateral position may be set using position information associated with a target object.

20 Claims, 17 Drawing Sheets

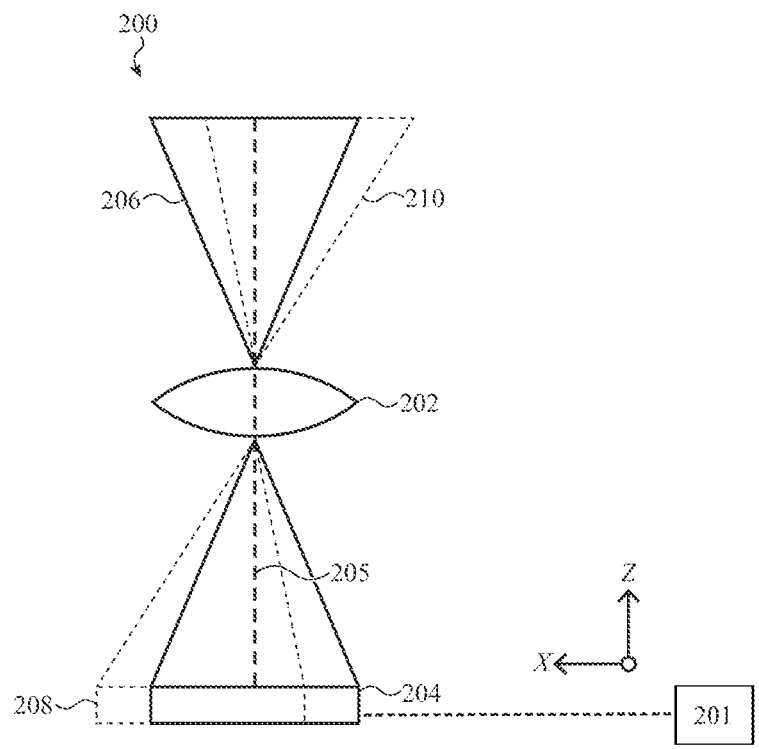
FIG. 2A
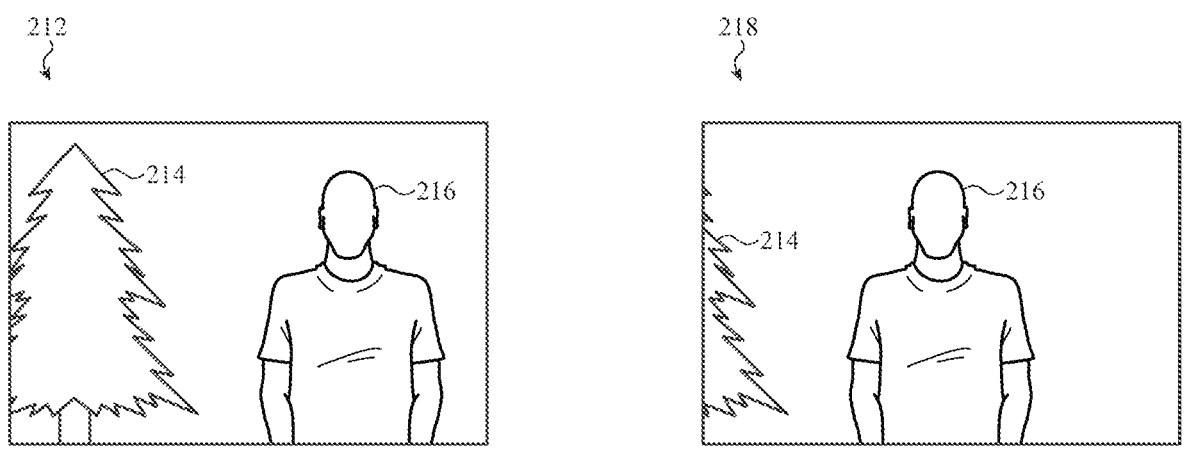
FIG. 2B
FIG. 2C

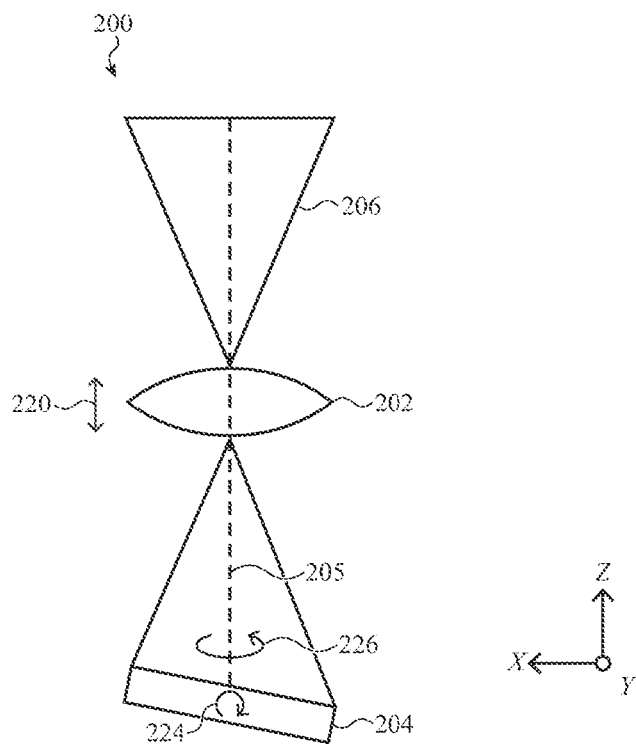
FIG. 2D
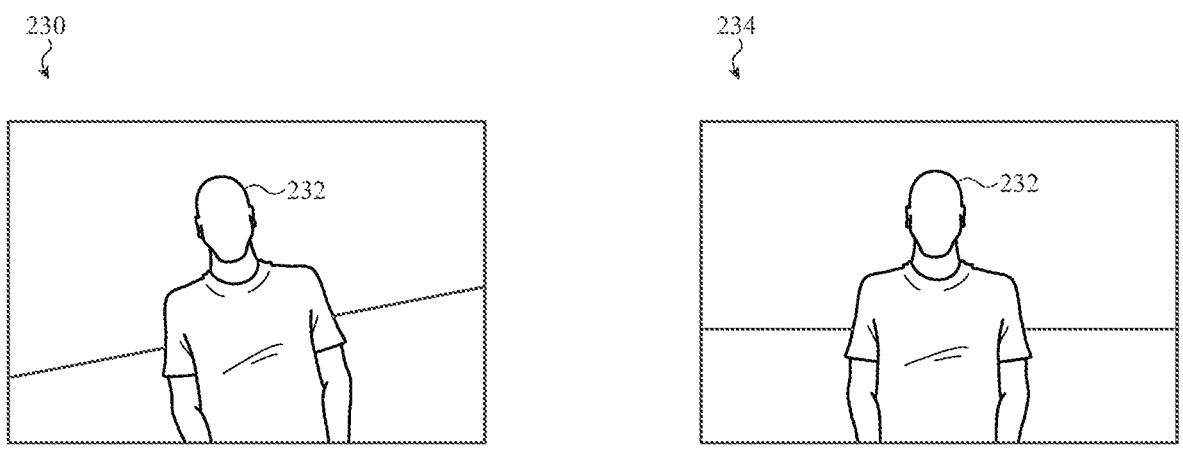
FIG. 2E                     FIG. 2F

DYNAMIC CAMERA FIELD OF VIEW ADJUSTMENT

FIELD

This disclosure relates generally to dynamically adjusting a field of view of a camera. More particularly, this disclosure relates to adjusting a field of view of a camera based on an orientation of the camera.

BACKGROUND

Cameras continue to be an important feature of consumer electronics devices such as smartphones, tablets, and computers. These cameras are used for a wide range of operations, such as capturing videos or still images or facilitating live video conferencing sessions. During live video conferencing sessions, a user may want to share content from different portions of their environment, but this typically requires a user to precisely position and/or manually reposition the camera to capture the desired content. Especially in instances where a user does not wish to actively hold the electronic device incorporating the camera, this need to precisely position (or reposition) the electronic device may be burdensome to the user.

SUMMARY

The present disclosure relates to cameras, devices, and systems for setting a default position of an adjustable field of view of a camera. In some embodiments, a system includes a device comprising a camera, the camera having an optical axis and an adjustable field of view. The camera may include a lens, an image sensor, and a position control logic configured to: (i) obtain camera orientation information associated with the camera, (ii) select a lateral position of a default field of view using the camera orientation information, (iii) control a relative position of the lens and the image sensor to maintain the adjustable field of view as the default field of view while the camera is stationary, and (iv) capture an image at the default field of view.

In some instances, the system further includes an accessory device coupled to the device, and the camera orientation information includes relative orientation information that includes a relative orientation between the camera and the accessory device. Additionally or alternatively, the camera orientation information includes relative orientation information that includes a relative orientation between a camera and a surface identified in a scene surrounding the camera. Additionally or alternatively, the camera orientation information includes absolute orientation information that includes a relative orientation between the camera and gravity.

The position control logic may be configured to perform optical image stabilization while the camera is moving, during which the position control logic temporarily moves the adjustable field of view away from the default field of view in response to camera motion. In some instances, the position control logic is (i) configured to obtain position information associated with a target object, and (ii) configured to select the lateral position of the default field of view using the camera orientation information and the position information. In some of these instances, the position control logic is configured to identify a set of potential lateral positions using the camera orientation information. The position control logic selects, using the position information, one of the potential lateral positions as the lateral position of the default field of view. In some instances, the position control logic is configured to control a relative rotation of the image sensor around the optical axis by an amount determined using the camera orientation information.

Other embodiments include a camera having an optical axis and an adjustable field of view, in which the camera includes a lens, an image sensor, and a position control logic. The position control logic is configured to: (i) obtain camera position information associated with a target object; (ii) select a lateral position of a default field of view using the position information, (iii) control a relative position of the lens and the image sensor to maintain the adjustable field of view as the default field of view while the camera is stationary, and (iv) capture an image at the default field of view. In some instances, the position control logic is configured to a relative tilt between the lens and the image sensor using the position information.

In other instances, selecting the lateral position of the default field of view includes determining whether a set of candidate positions exists that would position the target object in a first region of the adjustable field of view. In some instances, the position control logic is configured to select, in response to determining that the set of candidate positions exists, one of the set of candidate positions as the lateral position of the default field of view. In other instances the position control logic is configured to select, in response to determining that the set of candidate positions does not exist, the lateral position of the default field of view at a position that places the object in a second region of the adjustable field of view.

Still other embodiments include methods of capturing images. In some instances, a method includes, at a system that includes a display and a camera having an adjustable field of view, capturing a first image stream while the adjustable field of view has a default field of view set at a first lateral position and generating a first set of output images from the first image stream. In some these instances, the first lateral position may be selected using camera orientation information associated with the camera. In some instances, the first set of output images is a video feed, and the method further includes displaying, via the display, a communication user interface for a videoconferencing session, the communication user interface including the video feed. The video feed may include a representation of a surface in a scene surrounding the camera.

In some variations, the method includes capturing a second image stream while the adjustable field of view has the default field of view set at a second lateral position and generating a second set of output images from the second image stream, where the second lateral position is selected using position information associated with a target object. Additionally or alternatively, the first lateral position is selected using both the camera orientation information and position information associated with a target object. In some of these variations, the method further comprises generating a second set of output images from the first image stream. The first set of output images may be generated from a first cropping boundary applied to the first image stream, and the second set of output images may be generated from a second cropping boundary applied to the first image stream.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which:

FIGS. 2A and 2D show side view of a variation of a camera as described herein.

FIGS. 2B, 2C, 2E, and 2F show example images captured by the camera of FIGS. 2A and 2D.

Figure 1A:
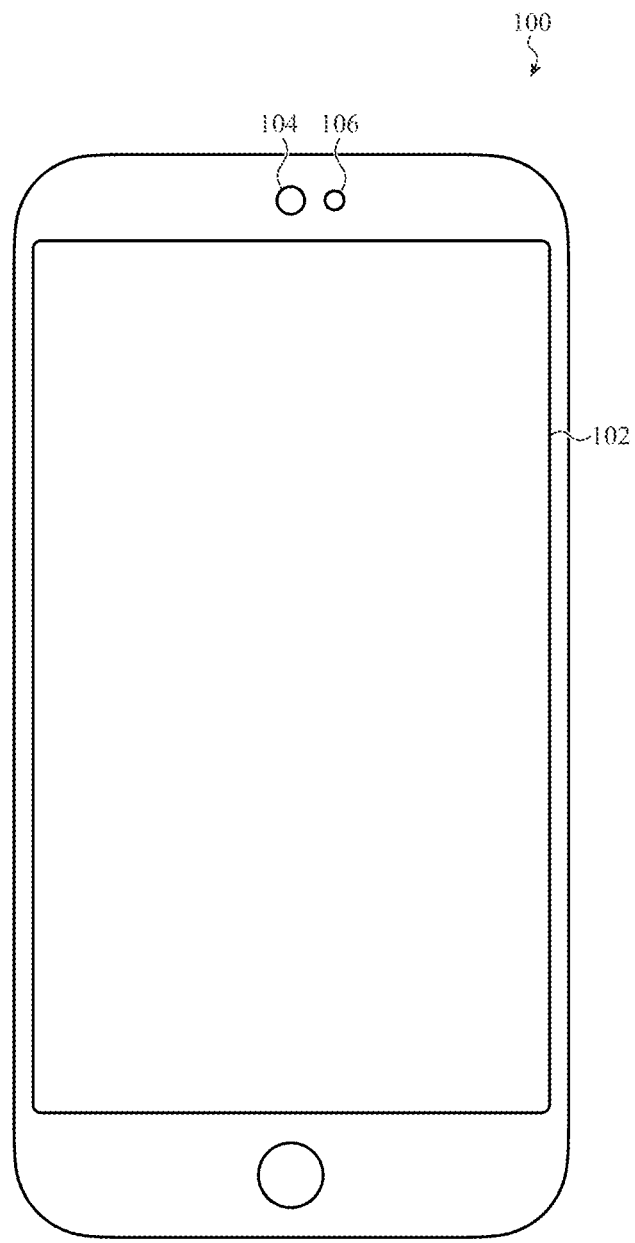
FIGS. 1A and 1B show front and rear views, respectively, of an example of an electronic device having a camera with an adjustable field of view.

It should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

Directional terminology, such as "top", "bottom", "upper", "lower", "front", "back", "over", "under", "above", "below", "left", "right", "vertical", "horizontal", etc. is used with reference to the orientation of some of the components in some of the figures described below, and is not intended to be limiting. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways. Also, as used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to cameras having adjustable fields of view, devices and systems incorporating the same, and methods of using the same to capture images. Specifically, the cameras, devices, and systems may be used to set the default configuration of a camera's field of view (i.e., the configuration of the camera's field of view when the device is not moving). In some instances, a lateral position of the camera's default field of view is set using position information associated with a target object in a scene surrounding the camera. Additionally or alternatively, the lateral position of the camera's default field of view is set using orientation information associated with the camera. These and other embodiments are discussed below with reference to FIGS. 1A-9B. However, those skilled in the art will readily appreciate that the detailed description given herein with respect to these Figures is for explanatory purposes only and should not be construed as limiting.

Figure 1B:
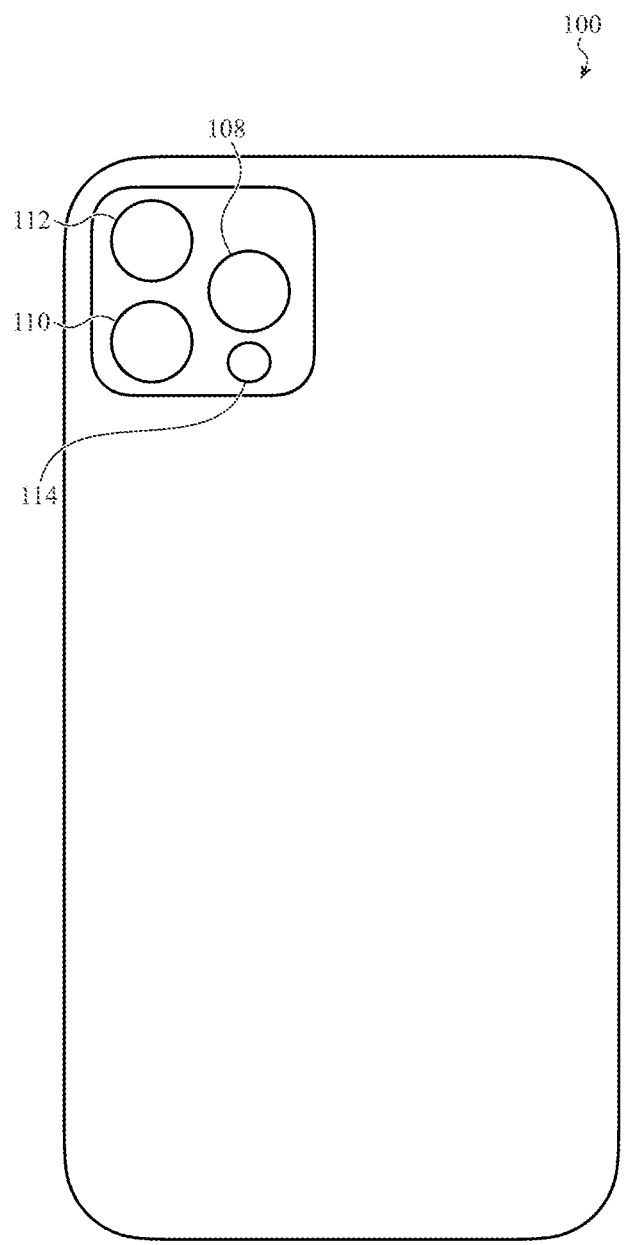
Figure 1C:
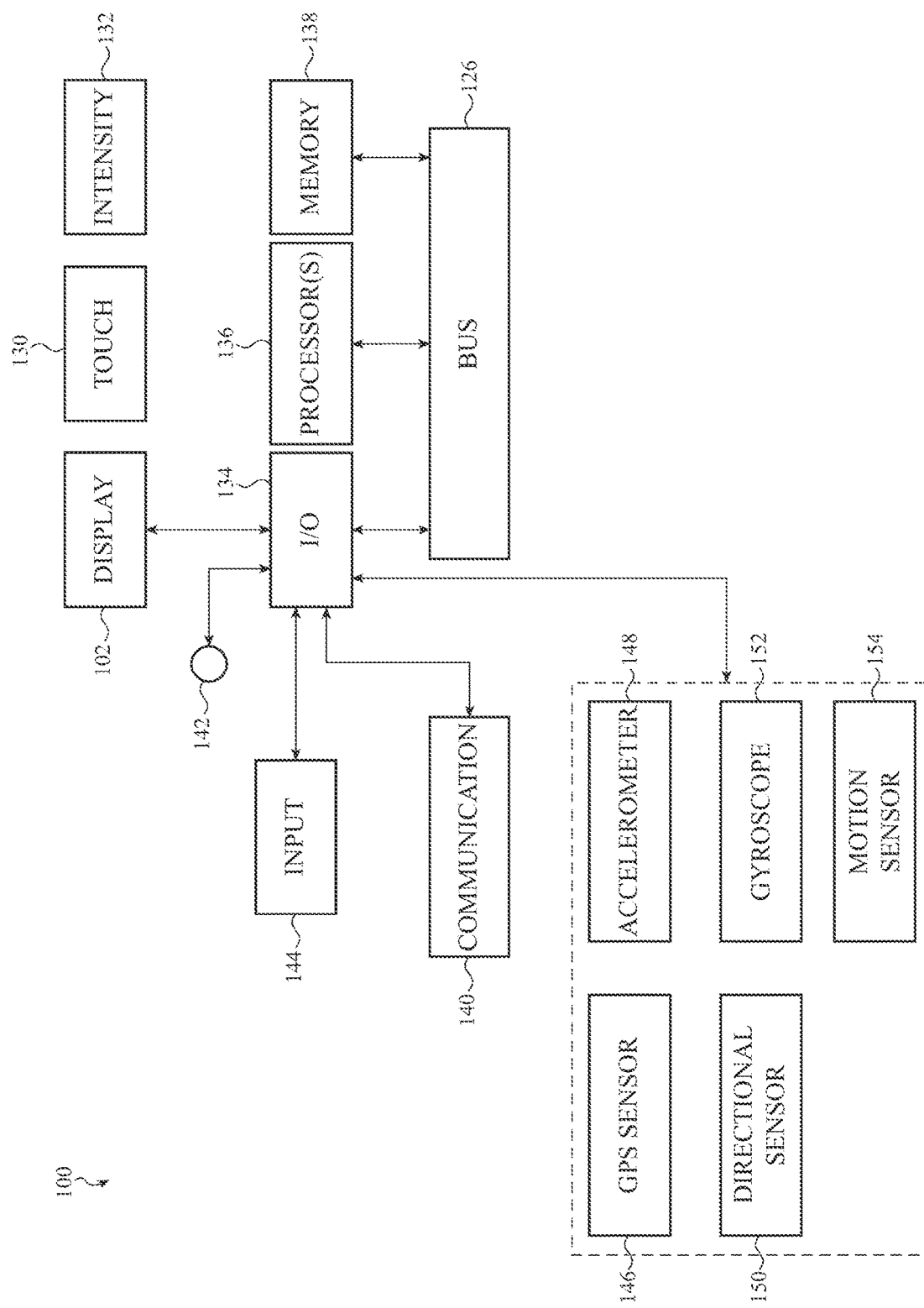
FIG. 1C depicts exemplary components of the device of FIGS. 1A and 1B.

The devices, systems, and methods described here include an electronic device having at least one camera with a moveable field of view. FIGS. 1A-1C depict an example device 100 as described herein. FIG. 1A shows a front view of the device 100, which includes a display 102 and a front-facing camera 104. The display 102 may provide a graphical output that is viewable through or at a front exterior surface of the device 100. The front-facing camera 104 is positioned to view a portion of the environment in front of the display 102. When the device 100 is used to facilitate a live video conferencing session with a second device (not shown), the front-facing camera 104 may capture a video stream of the user for transmission to a second device. A video stream received from the second device may be displayed via the display 102 to facilitate real-time video communication between the two devices.

In some instances, the device 100 may further include a front-facing depth sensor 106 that may calculate depth information for a portion of the environment in front of the device 100. The depth sensor 106 may be any suitable system that is capable of calculating the distance between the depth sensor 106 and various points in the environment around the device 100. The depth sensor may generate a depth map including these calculated distances, some or all of which may be used in the various techniques described below. The depth information may be calculated in any suitable manner. In one non-limiting example, a depth sensor may utilize stereo imaging, in which two images are taken from different positions, and the distance (disparity) between corresponding pixels in the two images may be used to calculate depth information. In another example, a depth sensor may utilize structured light imaging, whereby the depth sensor may image a scene while projecting a known pattern (typically using infrared illumination) toward the scene, and then may look at how the pattern is distorted by the scene to calculate depth information. In still another example, a depth sensor may utilize time of flight sensing, which calculates depth based on the amount of time it takes for light (typically infrared) emitted from the depth sensor to return from the scene. A time-of-flight depth sensor may utilize direct time of flight or indirect time of flight, and may illuminate an entire field of coverage (i.e., the widest lateral extent to which the depth sensor is capable of providing depth information) at one time, or may only illuminate a subset of the field of coverage at a given time (e.g., via one or more spots, stripes, or other patterns that may either be fixed or may be scanned across the field of coverage).

FIG. 1B shows a rear view of the device 100, which includes a set of rear facing cameras. In the variation shown in FIG. 1B, the set of rear facing cameras includes a first rear-facing camera 108, a second rear-facing camera 110, and a third rear-facing camera 112. The rear-facing cameras may have fields of view that at least partially overlap with each other, which may allow the rear-facing cameras to capture different aspects of a scene facing a rear surface of the device 100. For example, in some instances each rear-facing camera has a different focal length, and thereby has a field of view with a different size. The choice of the size of a camera's field of view may impact the situations in which a particular camera may be useful. For example, cameras with longer focal lengths (and narrower fields of view) are often used in telephoto imaging where it is desirable to increase the magnification of a subject at farther distances, while cameras with shorter focal lengths (and wider fields of view) are often used in instances where it is desirable to capture more of a scene (e.g., landscape photography). It should be appreciated that the field of view of a camera refers to the spatial extent of a scene that the camera is able to capture using an image sensor of the camera. As will be discussed in more detail below, the camera and any associated devices may use all or only some of the camera's field of view when generating images. In other words, when the camera is used to capture an image, the image presented to a user may only represent a subset of the camera's field of view.

Also shown there is a rear-facing depth sensor 114, which may be configured in any manner as discussed previously with respect to the front-facing depth sensor 106. While the device 100 is shown in FIGS. 1A and 1B as having four cameras and two depth sensors, it should be appreciated that the device 100 may have any number of cameras and depth sensors as desired. The principles described herein may be applied to any camera or cameras of the device 100. For the purpose of illustration, the principles of operation described herein are described with respect to a single camera of a device, which may represent any camera of that device (e.g., a front-facing camera, a rear-facing camera, or the like).

In some embodiments, the device 100 is a portable multifunction electronic device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer, which may have a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system (e.g., display 102). In some embodiments, the display generation component is separate from the computer system. As used herein, "displaying" content includes causing to display the content by transmitting, via a wired or wireless connection, data (e.g., image data or video data) to an integrated or external display generation component to visually produce the content.

FIG. 1C depicts exemplary components of device 100. In some embodiments, device 100 has a bus 126 that operatively couples I/O section 134 with one or more computer processors 136 and memory 138. I/O section 134 can be connected to display 102, which can have touch-sensitive component 130 and, optionally, intensity sensor 132 (e.g., contact intensity sensor). In addition, I/O section 134 can be connected with communication unit 140 for receiving application and operating system data, using Wi-Fi, Bluetooth, near field communication (NFC), cellular, and/or other wireless communication techniques. Device 100 can include input mechanisms 142 and/or 144. Input mechanism 142 is, optionally, a rotatable input device or a depressible and rotatable input device, for example. Input mechanism 142 is, optionally, a button, in some examples. Device 100 optionally includes various sensors, such as GPS sensor 146, accelerometer 148, directional sensor 150 (e.g., compass), gyroscope 152, motion sensor 154, and/or a combination thereof, all of which can be operatively connected to I/O section 134. Some of these sensors, such as accelerometer 148 and gyroscope 152 may assist in determining an orientation of the device 100 or a portion thereof.

Memory 138 of device 100 can include one or more non-transitory computer-readable storage mediums, for storing computer-executable instructions, which, when executed by one or more computer processors 136, for example, can cause the computer processors to perform the techniques that are described here (methods performed by the position control logics described below). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

The processor 136 can include, for example, dedicated hardware as defined herein, a computing device as defined herein, a processor, a microprocessor, a programmable logic array (PLA), a programmable array logic (PAL), a generic array logic (GAL), a complex programmable logic device (CPLD), an application-specific integrated circuit (ASIC), a field-programmable gate array (FPGA), or any other programmable logic device (PLD) configurable to execute an operating system and applications of device 100, as well as to facilitate setting a field of view of a camera and capturing of images as described herein. Device 100 is not limited to the components and configuration of FIG. 1C, but can include other or additional components in multiple configurations.

At least one camera 100 of device 100 is configured to controllably translate a position of its field of view by creating lateral relative movement between an image sensor and a lens of the camera. FIG. 2A shows a schematic representation of a portion of a camera 200 that includes a lens 202 and an image sensor 204. The lens 202, while represented in FIG. 2A as a single lens element, includes one or more lens elements that are collectively configured to direct light received by the camera 200 toward the image sensor 204. The image sensor 204 receives light from the lens 202 to capture images during one or more photography modes (e.g., a photo mode that can capture still images, a video mode that may capture videos, a panoramic mode that can capture panoramic photos, a portrait mode that can capture a still photo having an artificial bokeh applied, or the like).

The camera 200 includes one or more actuators (not shown) that create relative movement between the image sensor 204 and the lens 202, and this relative movement may be controlled by a position control logic 201 as discussed herein. For example, the image sensor and lens may translate laterally relative to each other in a direction perpendicular to an optical axis 205 of the camera 200. This in turn will laterally translate the field of view of the camera. For example, in FIG. 2A the image sensor 204 is shown in a first position, and has a first field of view 206 at the first position. If the image sensor 204 is moved laterally to a second position 208 (shown in phantom), the camera will have a second field of view 210 (shown in phantom) that is laterally translated relative to the first field of view 210. The optical axis 205 of the camera 200 is shown in FIG. 2A as being positioned along a Z-axis of a cartesian coordinate system, and lateral translation in these instances occur along the X-axis and/or Y-axis (e.g., the first position and second position of the image sensor 204 are laterally translated along the X-axis in FIG. 2A).

FIGS. 2B and 2C shows an example of a pair of images captured by the camera 200 using laterally-shifted fields of view. Specifically, FIG. 2B shows a first image 212 of a scene captured using the first field of view 206, and shows a tree 214 toward the left side of the image and a person 216 toward a right side of the image. FIG. 2C shows a second image 218 of the scene captured using the second field of view 210, in which the tree 214 has almost completely moved out of the field of view and the person 216 is centered in the image. By laterally shifting a position of the field of view of the camera 200, the camera 200 can selectively capture different content from a given scene, as discussed in more detail below.

When a camera of the devices described herein, such as camera 200, is configured to laterally move the field of view of the camera, this lateral movement may be used to perform optical image stabilization. When a camera performs optical image stabilization, the camera adjusts a lateral position of the field of view (i.e., by relative movement between the lens and image sensor in a direction perpendicular to the optical axis of the camera) in response to device movement, with the intent of maintaining the field of view of the camera to image a specific portion of the scene. For example, when a user is holding a device and capturing images using the camera, optical image stabilization may compensate for movement of the camera resulting from user handshake, vibration, or the like. As a result, the camera may capture sharper still images and videos with improved stabilization.

While optical image stabilization helps to maintain the field of view on a given portion of the scene in response to camera motion, these techniques do not impact the position of the field of view when the camera is stationary. Conversely, the devices, systems, and methods described herein are directed to setting a default field of view. As used herein, the "default field of view" of a camera is the size (which may be a fixed value in instances the camera has a fixed focal length) and lateral position of the camera's field of view when the camera is not moving. Accordingly, when the camera is stationary, the camera may maintain its field of view at the default field of view (i.e., at the size and lateral position of the default field of view). In some instances, the cameras described herein may also perform optical image stabilization, during which the field of view will temporarily move from the default field of view in response to camera movement.

The devices described here may comprise a position control logic 201 that is programmed to select a default field of view for a camera of the device. When setting the default field of view for a camera, the position control logic 201 selects a lateral position of the default field of view. In instances where the default field of view has a variable size (e.g., when the camera 200 is capable of optical zoom as discussed below), the position logic 201 may also set the size of the default field of view. In instances where the device includes multiple cameras with laterally moveable fields of view, there may be a single position control logic that selects default fields of view for multiple of these cameras. In other instances, there may be multiple position control logics that each set the default field of view for a corresponding camera. For example, a first position control logic may select the default field of view for a first camera, and a second position control logic may select the default field of view for a second camera.

The position control logic 201 may select the default field of view using one or more inputs. In some instances, an input includes position information of a target object relative to the camera. Additionally or alternatively, an input includes orientation information associated with the camera. These inputs will be described in more detail below. When the position control logic 201 uses position and/or orientation information as described below, the position control logic 201 may derive this information from information received by one or more cameras, depth sensors, other sensors (such as an accelerometer, directional sensor, gyroscope, and/or motion sensor as discussed above), or the like, or may receive this information after it has already been calculated (e.g., by one or more processors elsewhere in the device or system).

When the position control logic 201 calculates the default field of view for a given camera, it may also set the instantaneous position and/or size of the field of view of the camera using the calculated default field of view. The position control logic 201 may drive actuation of the camera to provide the necessary internal movement (e.g., movement of the lens 202 and/or image sensor 204) to move the field of view accordingly. When, for example, the camera is stationary, the position control logic 201 may set the instantaneous position (and size) of the field of view as the default field of view. In instances where the camera is configured to provide optical image stabilization, the position control logic 201 may set the instantaneous position at a different position from the default field of view while the camera is moving, where these different positions are calculated based on the motion of the camera.

In some instances, the camera 200 may be configured to create relative movement between the image sensor 204 and the lens 202 in additional directions to provide additional functionality to the camera. FIG. 2D shows some ways in which the camera 200 of FIG. 2A may facilitate additional movement between the image sensor 204 and the lens 202. For example, an actuator of the camera 200 may be configured to create relative movement between the image sensor 204 and one or more lens elements of the lens 202 along the optical axis 205 of the camera 200 (as indicated by arrow 220). In some instances, this relative movement adjusts the focal plan of the camera 200, which actively changes the focus of the camera. This may allow the camera 200 to provide autofocus capabilities in which the camera automatically adjusts the focus of the camera.

Additionally or alternatively, relative movement of one or more lens elements of the lens 202 along the optical axis may be used to change the focal length of the lens 202, and thereby provide optical zoom functionality to the camera 200. In general, the size of the field of view for a camera is inversely related to the focal length of the camera. In other words, as the length of the focal length of the lens 202 increases (i.e., the camera "zooms in"), the camera's field of view will narrow. Accordingly, it may be possible for the camera 200 to alter its field of view both via optical zoom (which will increase or decrease the size of the field of view) and lateral shifting (which will change a center of the field of view relative to the camera). At a given optical zoom level, laterally shifting the field of view will maintain that same size field of view while moving the field of view to capture a different portion of a scene. It should be appreciated that there may be instances where a camera simultaneously changes the size and lateral position of the field of view. For the purpose of this application, changing the optical zoom of a camera without changing a center of the field of view does not count as lateral movement of the field of view.

In some instances, the image sensor 204 may be tilted relative to the lens 202 (or vice versa). In these instances, one of the image sensor 204 or lens 202 may be rotated around a direction perpendicular to the optical axis 205 of the camera. While an imaging surface of the image sensor 204 is shown in FIG. 2A is positioned perpendicular to the optical axis 205 of the camera, the image sensor 204 is shown in FIG. 2D as being rotated around the Y-axis (as indicated by arrow 224) to tilt the image sensor 204. This tilting changes the angle of the focal plane of the camera. When the image sensor 204 is positioned as shown in FIG. 2A, the focal plane is perpendicular relative to the camera and thus objects at a given distance from the camera will be in focus across the entire scene. When the image sensor 204 is tilted as shown in FIG. 2D, the focal plane will be at a non-perpendicular angle relative to the camera, and the distance at which objects will be in focus will vary across the scene. In this way, tilting the image sensor 204 impacts which portions of a scene imaged by the camera 200 will be in focus.

Additionally or alternatively, the image sensor 204 may be configured to rotate around the optical axis 205 of the camera, as indicated by arrow 226 in FIG. 2D. In these instances, rotating the image sensor 204 around the optical axis 205 will rotate the camera's field of view. While this rotation may not change the center or size of the field of view, it may still impact which portion of the scene is captured by the camera. This rotation may change the orientation of images captured by the camera.

FIGS. 2E and 2F show an example of a pair of images captured by the camera 200 using rotated fields of view. Specifically, FIG. 2E shows an image 230 of a scene captured using an initial field of view, and shows a person 232. In this field of view, the image sensor 204 may be angled relative to the ground, which causes the person 232 to appear tilted to one side. FIG. 2F shows another image 234 of the scene captured using a field of view that is rotated relative to the initial field of view, causing camera 200 to properly capture the orientation of the person 232 as they stand in the scene.

In some instances, rotating the field of view of the camera 200 may be used to account for manufacturing misalignments between a camera 200 and the device (e.g., device 100 discussed above) into which the camera 200 is integrated, which cause the field of view of the camera to be slightly rotated relative to what is desired. While this could be corrected for in software by cropping and rotating a portion of the images captured by the camera 200, this reduces the amount of the image sensor that can be used for generating images. In other instances, this misalignment may be measured (e.g., during factory calibration) and the image sensor may be rotated by a predetermined amount during operation of the camera 200 to account for some or all of this misalignment, thereby allowing a larger portion of the imaging area of the image sensor 204 to be utilized. Additionally or alternatively, rotation of the image sensor may be used to account for the orientation of the device, as will be discussed in more detail below.

It should be appreciated that any of the relative movement between the image sensor and the lens discussed above (e.g., relative movement along the optical axis, relative movement laterally relative to the optical axis, or tilting relative to the optical axis of the camera) may be achieved via movement of the lens and/or the image sensor, depending on the design of the camera. Additionally, in some instances the lens may include one or more lens elements that can change their shape (e.g., a liquid lens). For the purpose of this application, the change of shape of these lenses is considered to be movement to the extent that the shape change achieves one or more of the functions described above (e.g., changing the focus of the camera, laterally translating the field of view, or the like). Accordingly, the cameras described herein may have flexibility in the architecture used to create the movement described with respect to FIGS. 2A-2F.

Figure 3:
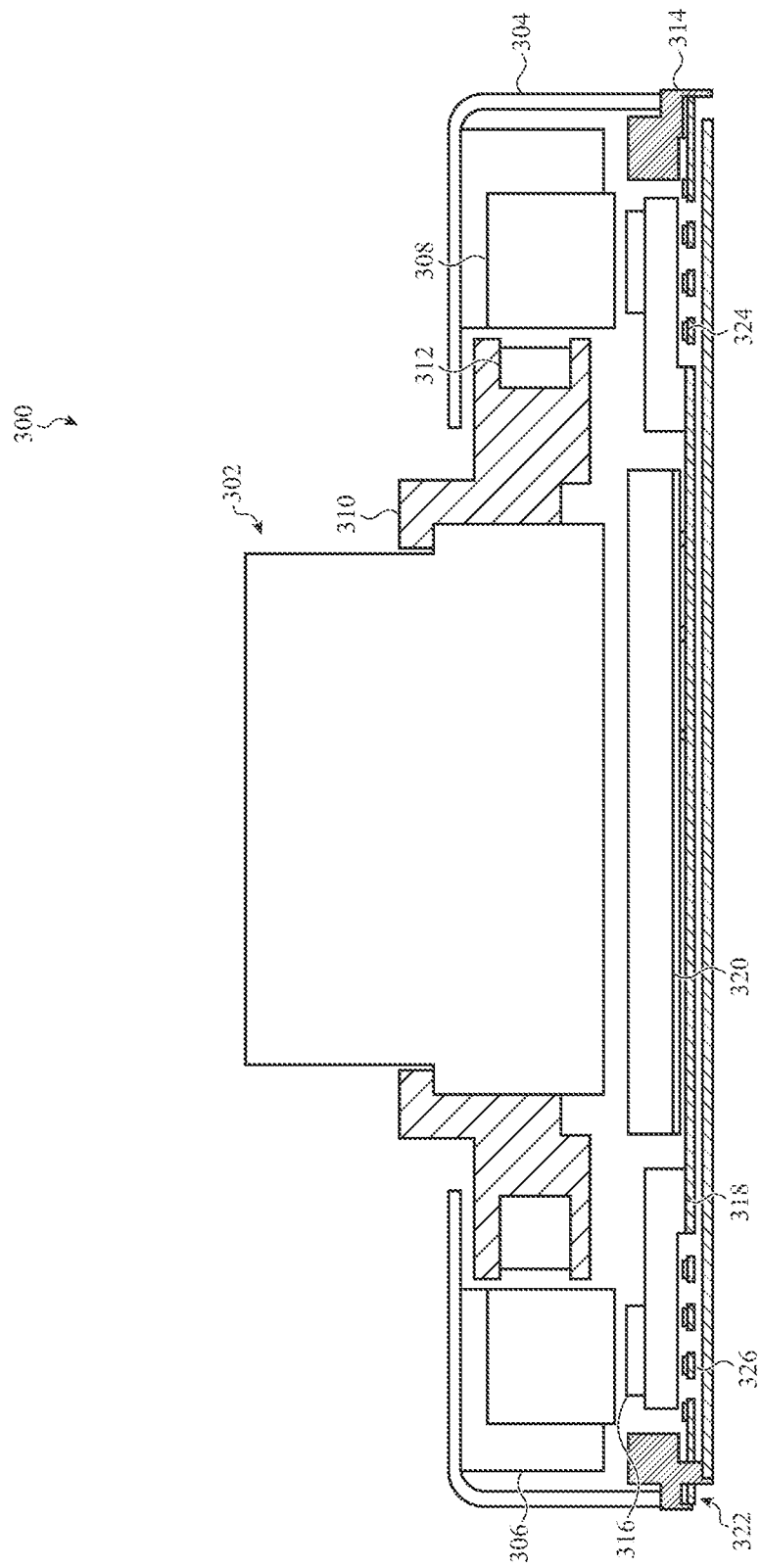
FIG. 3 shows a cross-sectional side view of an illustrative example of a camera that may be used with the devices described herein.

For example, FIG. 3 shows an illustrative example of a camera 300 that may be used with the devices, systems, and methods described herein. As shown, camera 300 includes a lens 302, an image sensor 320, a housing 304, and an actuator that is configured to move the lens 302 along an optical axis of the camera to adjust the focus of the camera and to move the image sensor 320 transverse to the optical axis to laterally move the field of view of the camera 300. To move the lens 302 (which may contain one or more lens elements and a lens barrel, such as discussed above), the lens 302 is attached to a coil 312 (e.g., via a lens carrier 310, which is configured to hold both the lens 302 and the coil 312). The lens 302 and lens carrier 310 are suspended relative to a stationary portion of the camera 300 (e.g., relative to a magnet holder 306) via one or more suspension elements (not shown), such as one or more flexures (e.g., leaf spring(s), suspension wire(s), flexure arms(s), or the like) and/or one or more bearings (e.g., ball bearing(s), roller bearing(s), or the like). The magnet holder 306 holds one or more magnets 308, and the coil 312 is positioned within the magnetic field of the magnets 308 such that when current is driven through the coil 312, Lorentz forces are generated that can create relative movement between the coil 312 and magnets 308, which in turn may move the lens 302 along the optical axis of the camera.

To move the image sensor 320 in one or more directions perpendicular to the optical axis and laterally shift a position of the camera's field of view, the camera 300 includes a stationary base 314 (which may be fixed relative to housing 204) and a frame 322 that moveably connects the image sensor 320 to the base 314 via a plurality of flexures 326. In some instances the flexures 326 support electrical traces 324, which may be used to carry signals to and from the image sensor 320. Also shown there is a printed circuit 318 which carries one or more coils 316 (which are separate from the coil 312 carried by the lens carrier 310). The coils 316 may be positioned within the magnetic field of the one or more magnets (e.g., magnets 308 in the variation shown in FIG. 3) such that when current is driven through the coils 316, Lorentz forces are generated that can create relative movement between the coils 316 and magnets 308, which in turn may move the image sensor 320 perpendicular to the optical axis of the camera. In some instances, the coils 316 and magnets may be positioned and controlled to provide Lorentz forces in a manner that cause the frame 322 and image sensor 320 to rotate around the optical axis of the camera.

In some instances, the camera 300 may be further configured to tilt the lens 302 and/or image sensor 320 relative to the optical axis of the camera 300. For example, to tilt the lens 302 relative to the optical axis of the camera 300, the camera 300 may include multiple coils attached to the lens (either replacing or in addition to coil 312). In this instance the coils may be positioned on different sides of the lens, and may interact with one or more magnets in the camera (e.g., magnets 308) to create Lorentz forces as discussed above. These coils may be controlled to provide unequal Lorentz forces directed along the optical axis, which may cause the lens 302 to rotate and thereby tilt relative to the optical axis. If the coils are controlled to provide equal Lorentz forces, the lens 302 may move along optical axis of the camera 300 without tilting. Similarly, the camera 300 may be configured to tilt the image sensor 320 using one or more coils that provide unequal Lorentz forces directed along the optical axis. Additional non-limiting examples of cameras that move a lens and/or image sensor in multiple directions are described in U.S. Patent Application Publication Nos. US 2021/0132327 (titled "Camera Actuator for Lens and Sensor Shifting") and US2021/0080807 (titled "Camera Focus and Stabilization System"), the contents of which are incorporated herein by reference in their entireties.

Figure 4A:
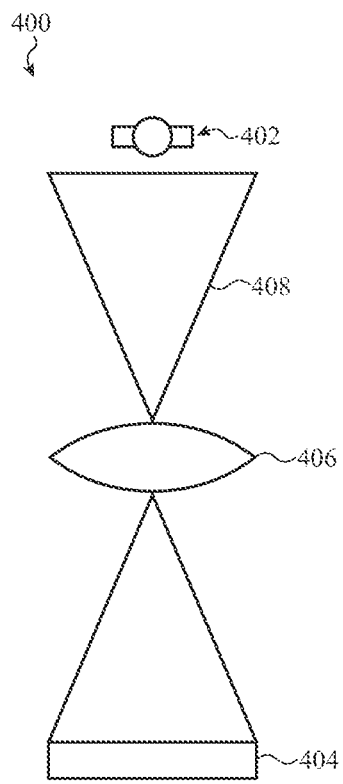
FIGS. 4A, 4D, 4F, and 4H show top views of a camera positioned to image a person using an adjustable field of view.

As mentioned above, the cameras described herein may be configured to adjust a lateral position of a default field of view for the camera. This allows the camera to visualize different portions of a given scene as may be desired. For example, in some instances a lateral position of a camera's field of view may be determined at least in part based on a position of an object within a scene. For example, FIG. 4A shows an example of a camera 400 that is used to capture an image stream of a person 402 positioned in a scene surrounding the camera. The camera 400 includes an image sensor 404 and a lens 406, and is configured to create relative movement between the image sensor 404 and lens 406 to laterally shift a field of view of the camera 400.

In FIG. 4A, the person 402 is positioned at a first location in the scene and the camera 400 has a first field of view 408 having a first lateral position. For the purpose of this application, when a person or object is discussed as being positioned at a location, this refers to the location of a representative point (or multiple points) in a space that is selected to represent the person or object. For example, for a person, the representative point may be selected to correspond to a predetermined portion of the person's face or body, such as a center of the face, a point between the eyes of the person, a point on their nose, or the like. For a non-person object, the representative point may be a center of the object or another point that may depend on the type of object.

While the person 402 is in the first position, the camera 400 may capture one or more images with the first field of view 408, which may be used to generate one or more output images. These output images may be used for a number of purposes. For example, the output images may be used to generate a live preview that will be displayed during a camera user interface that displays the stream of output images. The output images illustrate to a user the portion of the field of view that will be saved when the camera initiates a media capture event. When the camera initiates a media capture event (under some predetermined conditions or when a user gives a command to capture images by interacting with a shutter control on a user interface, pressing a designated button on the device, giving a voice command, or the like), the camera will capture media depending on the current camera mode (e.g., capture a still image when in a photo mode or capture a video when in a video mode), which may then be stored locally on the device 100 or transmitted to a remote server for storage.

Figure 4B:
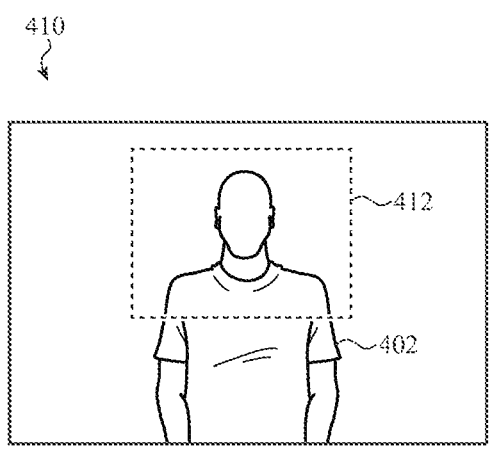
FIGS. 4B, 4E, 4G, and 4I show example images captured by the camera of FIGS. 4A, 4D, 4F, and 4H.

It should be appreciated that while the camera 400 will capture images having the full field of view of the camera, the output images may only represent a subset of the camera's field of view as mentioned above. For example, FIG. 4B shows an example image 410 captured by the camera 400 using the first field of view 408. Also shown there is a cropping boundary 412 that represents the portion of the image 410 that will be used to generate a corresponding output image (e.g., that is displayed in a live preview or stored as part of an image or video). In these instances, although additional image information is captured by the image sensor of the camera, the user will only see a cropped subset of the camera's field of view corresponding to the cropping boundary 412.

Figure 4C:
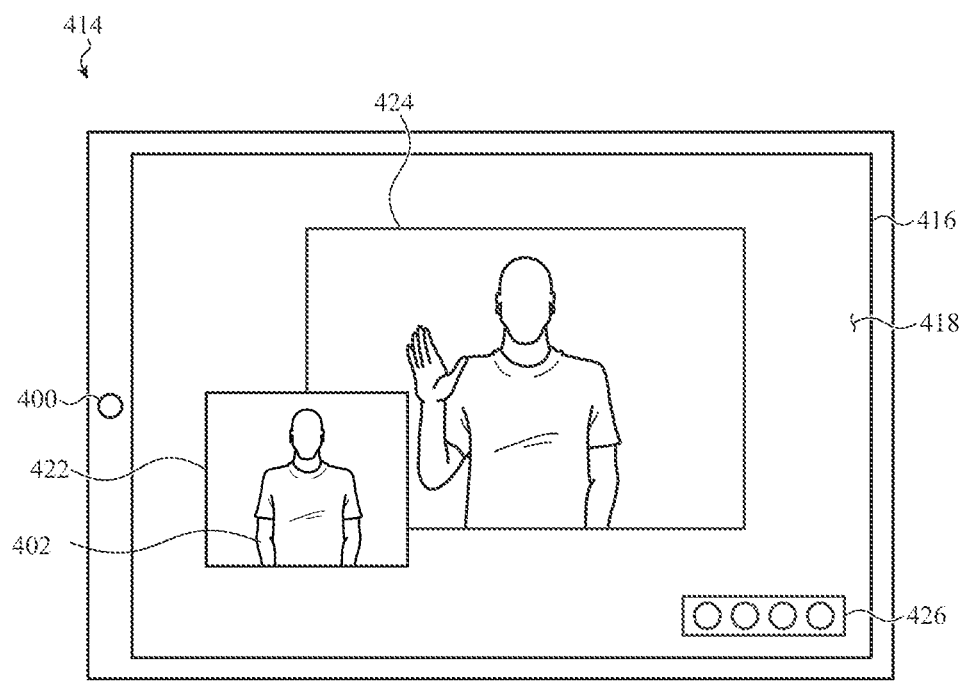
FIG. 4C shows a front view of a device incorporating the camera of FIGS. 4A, 4D, 4F, and 4H.

As an example, images captured by the camera 400 may be used to facilitate a video conferencing session. For example, FIG. 4C shows a device 414 that includes a camera 400 that may be used to facilitate a video conferencing session. The device 414, which may be configured in any manner as described above with respect to FIGS. 1A-1C, is shown in FIG. 4C as having a display 416 that displays a communication user interface 418. The communication user interface 418 includes a first video feed 422 and a second video feed 424. The first video feed 422 is a representation of an image stream captured by the camera 400 (including person 402), while the second video feed 424 is a representation of image data captured by a camera from a second device (not shown) that is communicated from the second device to device 414 during the video conferencing session. The first video feed 422 may be transmitted from device 414 to the second device during the video conferencing session to allow the first video feed 422 to be displayed from the second device. In the variation shown in FIG. 4C, a cropped portion of the camera's field of view corresponding to the cropping boundary 412 is used to generate the output images that form the first video feed 422. Also shown in FIG. 4C is a set of optional controls 426 that may be displayed in the communication user interface 418, which may be used (e.g., via corresponding user inputs to a touch-sensitive surface of the display) to control one or more aspects of the videoconferencing session (e.g., muting audio, applying visual effects to one of the video streams, terminating the videoconferencing session, or the like).

Figure 4D:
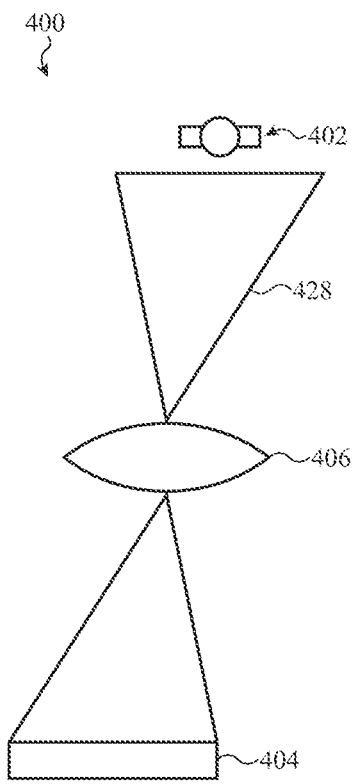
Figure 4E:
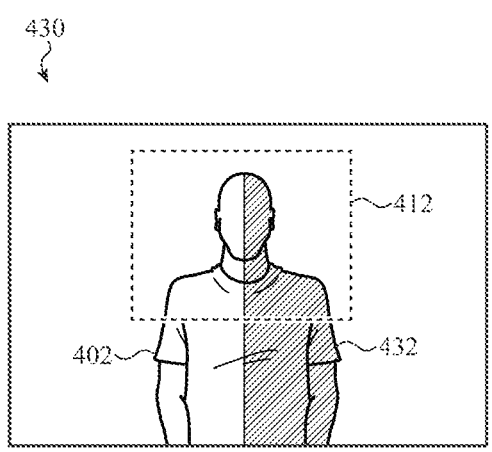

The camera 400 may change the lateral position of the field of view responsive to movement of the person 402 in the scene. For example, FIG. 4D shows the camera 400 imaging the person 402 while the camera is located in the same location as in FIG. 4A but the person 402 is positioned at a second location in the scene that is different that the person's first position from FIG. 4A. The image sensor 404 is laterally translated relative to the lens 406, thereby providing the camera with a second field of view 428 having a second lateral position different than the first lateral position. FIG. 4E shows an example image 430 captured by the camera 400 using the second field of view 428. As shown there, the person 402 is still centered in the image 430 even though the relative positioning between the person 402 and camera 400 has changed. If less than the full field of view of the camera is used (such as with the first video feed 422 in FIG. 4C), the cropping boundary 412 may keep its relative position with the field of view, and images generated from the cropping boundary 412 will also continue to include the person 402.

Figure 4F:
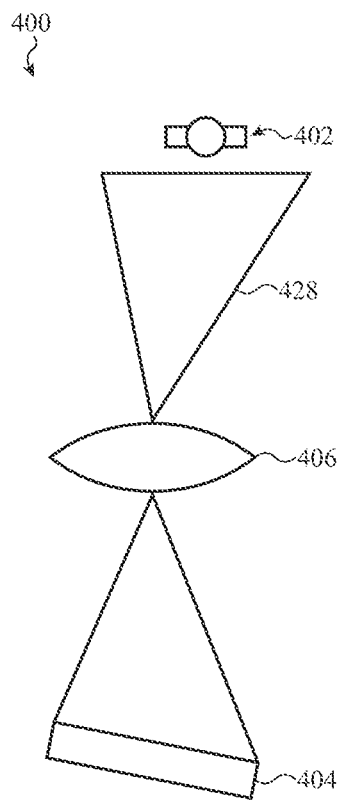
Figure 4G:
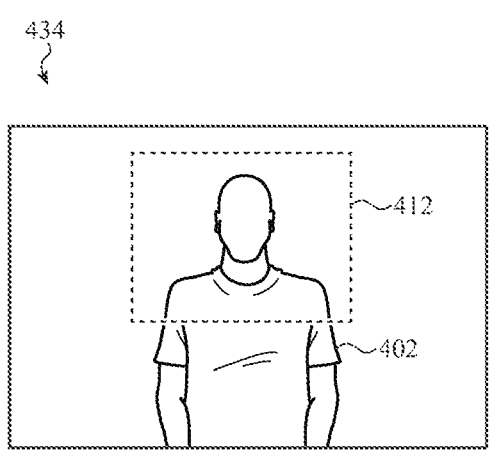

In some instances, it may also be desirable to set a relative tilt between the image sensor 404 and lens 406 (as discussed above with respect to FIG. 2D) based on the relative position between the person 402 and the camera 400. Depending on where the person 402 is located in the scene and how they are orientated relative to the camera, it may be possible that part of the person 402 is out of focus. For example, when the user is positioned as shown in FIG. 4D, a region 432 of the user is out of focus. As shown in FIG. 4F, the image sensor 404 may be tilted relative to the lens 406 (or vice versa), thereby changing the angle of the focal plane of the camera. The amount of tilt may be selected such that the region 432 is again in focus, as illustrated in FIG. 4G by an image 434 of the person 402 captured while the components of camera 400 are positioned as shown in FIG. 4F.

While the first field of view 408 shown in FIG. 4A and the second field of view 428 shown in FIG. 4D are positioned such that the person 402 stays centered in the camera's field of view, in some instances it may be possible for the person to be imaged at different positions within a given field of view. For example, when a cropping boundary 412 is used to select a subset of the field of view for generating an output image, it may be desirable to maintain the person 402 at a predetermined position within the cropping boundary 412. This allows the person 402 to maintain their position within output images generated from image data in the cropping boundary 412. There may be instances, however, where the relative position of the person 402 within the cropping boundary 412 may be maintained without needing to move the camera's field of view.

Figure 4H:
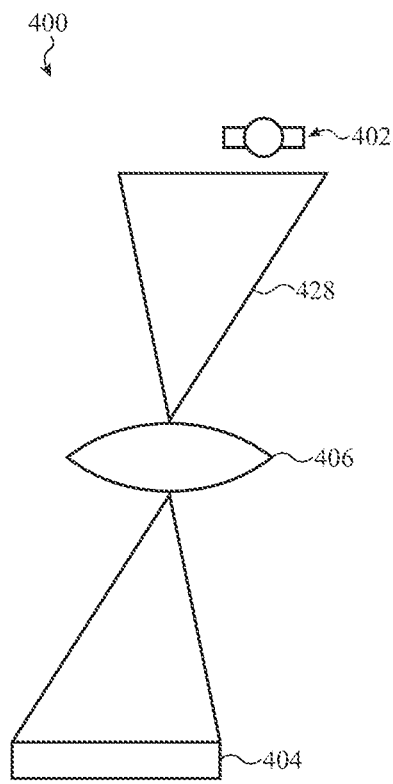
Figure 4I:
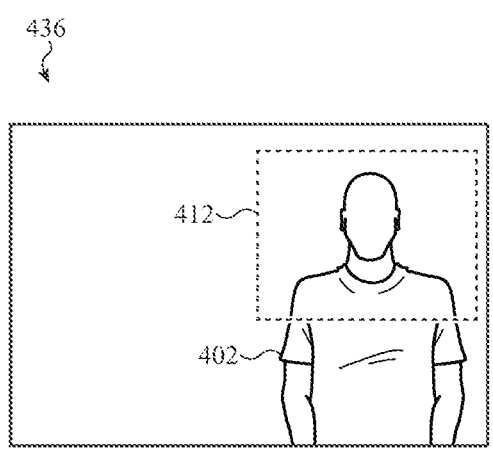

For example, FIG. 4H shows the camera 400 imaging the person 402 while the camera is located in the same location as in FIG. 4D but the person 402 is positioned at a third location in the scene that is different that the person's second position from FIG. 4D. In this instance, the camera 400 is still configured to image the second field of view 428 having the second lateral position, and the person 402 is still positioned within the second field of view 428. Accordingly, an image 436 captured by the camera 400 will still capture the person 402, as shown in FIG. 4I, but the person 402 is no longer centered in the camera's field of view 428. The relative position of the cropping boundary 412 within the camera's field of view may instead be moved in order to maintain the position of the person 402 within the cropping boundary 412. In this way, the camera may still generate output images that contain the person 402. By utilizing both a moving cropping boundary 412 and a laterally shifting field of view, the camera 400 can generate output images that include the person 402 across a wider extent of the scene than using either technique alone. Additionally, this can all be done without requiring the user to reposition the camera 400.

A moveable cropping boundary 412 may be used with a laterally shifting field of view in a number of ways. In some instances, the camera 400 may try to keep the person 402 at or near the center of the field of view when possible. Depending on the configuration of the camera 400, the image quality may be better near the center of the field of view due to vignetting or image distortions that may occur at the periphery of the field of view. Accordingly, the field of view of the camera 400 may be divided into a central region and a peripheral region at least partially surrounding the central region, and the camera 400 will attempt to select a default field of view having a lateral position at which the person 402 is positioned in the central region. In other words, the position control logic of a camera may determine whether a set of candidate positions exists that would place the person 402 in the center region. Upon a determination that candidate positions exist, the position control logic will select one of the candidate positions as the lateral position of the default field of view.

If the camera 400 is unable to move the field of view enough such that the person is positioned in the central region, the camera 400 will select a default field of view having a lateral position at which the person 402 is positioned in the peripheral region. In other words, upon determining that there are no candidate positions that would place the person in the center region, the position selection logic may instead select a lateral position that positions the object in the peripheral region. The cropping boundary 412 may be moved as needed to continue generating output images that include the person.

In some examples, the camera 400 will attempt to position the person 402 at a predetermined position within the field of view. In these examples, the central region is limited to a single target point, such as the center of the field of view, and the camera 400 will attempt to select a default field of view that positions the person 402 at this target point. The cropping boundary 412 may maintain its relative position while camera 400 is able to keep the person 402 at the target point, but then may change its position within the field of view as the camera 400 is no longer able to keep the person 402 at the target point.

In other examples, there may be multiple possible positions for the field of view that would position the person 402 in the central region, and the camera 400 will select a default field of view that minimizes power consumption by the camera 400. Specifically, the field of view of the camera 400 may have a resting position, which represents the position of the field of view when the camera 400 is not actively changing the field of view of the camera 400. Depending on the design of the camera 400, this resting position may be dependent on an orientation of the camera 400 due to the relative direction of gravitational forces on components of the camera 400 in different orientations. The camera 400 consumes power to move the field of view and/or hold the field of view at a position different than the resting position, and the amount of power consumed may depend on how far the current position of the field of view is from the resting position. Accordingly, the camera 400 can save power by keeping the field of view at or near the resting position when possible.

For example, the camera 400 may first attempt to set the resting position as the default field of view if doing so would position the person 402 within the central region. If the camera is able to do this, it may maintain the resting position as the lateral position for the default field of view for as long as the person 402 remains located in the central region. As the person 402 moves to different locations that are still within the central region, the cropping boundary 412 may move its relative location to track the person 402 without needing to change the lateral position of the default field of view (and thereby consume additional power). If the person 402 moves to a location outside the central region, the camera 400 may select a new default field of view that keeps the person 402 in the central region, if possible. Again, this new default field of view may be selected at a lateral position that consumes the least amount of power while still maintaining the person in the central region.

Figure 5:
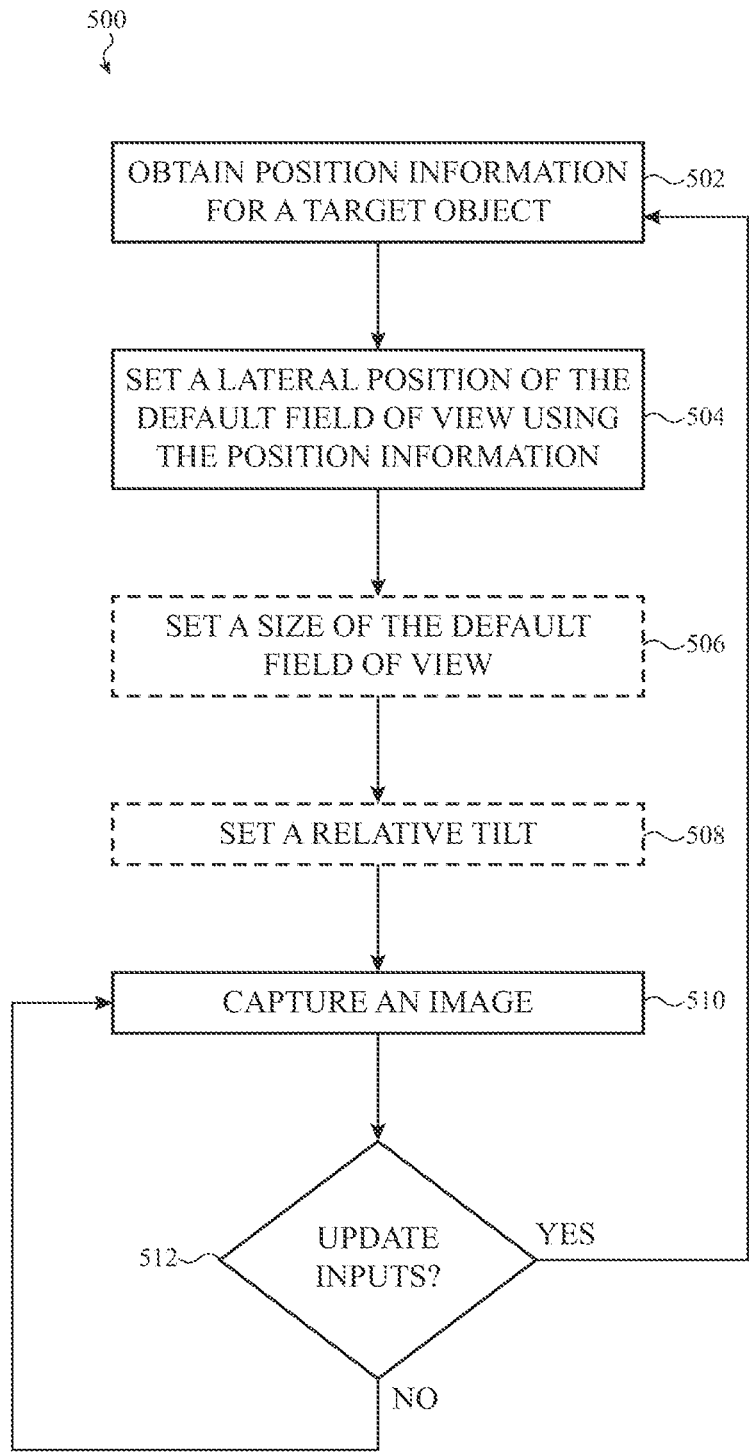
FIG. 5 depicts a method of setting a lateral position of a camera's field of view using position information associated with a target object.

While the example of camera 400 is discussed above as setting a default position based on the location of a person 402 within a scene, it should be appreciated that these techniques may be used to adjust the field of view of a camera FIG. 5 shows a flowchart that represents an example method 500 that a position control logic may utilize to select the default field of view for a camera of a device. Specifically, the position control logic may be configured to obtain position information associated with a target object at step 502. The target object may be a person or a non-person object, and may be selected using any suitable manner (e.g., selected based on object detection within images captured by the camera, selected based on a user input, or the like). In some instances multiple objects may be selected, and the target object may be a region of interest ("ROI") that encompasses two or more objects (it should be appreciated that the ROI may include two sections that need not be contiguous) or may be an ROI that corresponds to a single object (which may be selected from the multiple objects based on one or more predetermined criteria).

The position information includes a lateral location of the object (i.e., where the object falls within or relative to the field of view). In some instances, the position information also includes a proximity value representing a distance between the object and the camera. Additionally or alternatively, the position information may include relative orientation information that represents a relative orientation between the object and the camera (e.g., whether a person is facing the camera or positioned at an angle relative to the camera). This position information may be obtained using any suitable technique, such as performing image analysis of images captured by the camera (or by another camera or cameras of the device), analysis of depth information captured by a depth sensor of the device, combinations thereof, or the like.

At step 504, the position control logic is configured to set a lateral position of the default field of view of the camera using the position information of the object. If the lateral position of the default field of view set at step 504 is different than the current default field of view, the camera will laterally shift the field of view of the camera (e.g., via relative movement of a lens and image sensor of the camera as discussed previously) to the new lateral position. The position information of the object may be used in any manner as described above with respect to FIGS. 4A-4I to select the lateral position of the default field of view. For example, the position information of the object may be used to position the object within a target region of the field of view (e.g., a central region discussed previously) if possible.

In some instances, the position control logic is optionally configured to set a size of the default field of view using the position information of the object at step 506. If the camera has optical zoom capabilities, the focal length of the camera may be updated to change the size of the default field of view. The position control logic may be configured to change the size of the default field of view based on the proximity of the object to the camera, such as increasing the size of the default field of view as an object approaches the camera. In other instances, the position control logic may be configured to change the size of the default field of view based on the location of the object. For example, if the object has moved toward an edge of the default field of view but the camera is unable to further shift the field of view in this direction, the camera may zoom out to increase the size of the field of view. This may allow the camera to image the object over an even wider range of scene positions. Additionally or alternatively, the position control logic may also optionally set a relative tilt between the image sensor and the lens using the position information of the object at step 508. This allows the camera to adjust the focal plane of the camera as discussed above.

Once the default field of view (and relative tilt in instances where the method performs step 508) has been updated (and the camera has performed any actuation necessary to move the field of view to the selected default field of view), the camera captures an image at step 510. The camera may continue capturing images until one or more of the inputs to the position control logic are updated (at step 512) at which point a new iteration of the method 500 may be started again at step 502. These updates may occur after each image capture, or may be performed periodically such that multiple images are captured by the camera before the inputs to the position control logic are updated. Accordingly the camera may capture an image stream with a default field of view that dynamically updates as the object moves.

This captured image stream may be used (either by the device that includes the camera or another device that receives the captured image stream therefrom) to generate one or more output images as discussed in more detail above. In some instances, a cropping boundary may be applied to the captured image stream to set a boundary of the output images. The size and position of the cropping boundary applied to a captured image may be set using the position information for the object. For example, the relative position of the cropping boundary within the image stream may move to account for movements of the object within the field of view, such as described above with respect to FIGS. 4H and 4I.

As an example, the output images generated from the captured image stream may form the first video feed 422 in the videoconferencing session described above with respect to FIG. 4C. As the person 402 moves relative to the device 414, the default field of view (and the cropping boundary in instances where only a portion of the captured images are used to generate the first video feed) may adjust to maintain the person 402 at a target position within the video feed 422. Accordingly, the person 402 may be captured across a wide range of scene locations without requiring a user to manually change the position of the device 414.

Figure 6A:
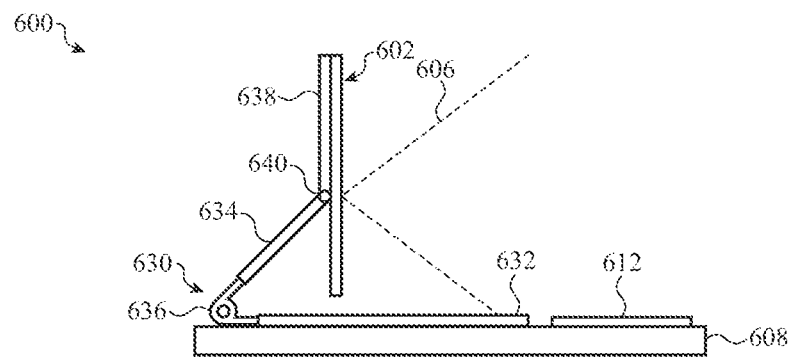
FIGS. 6A and 6D show side views of a variation of a system as described herein, including a device that has a camera with an adjustable field of view.
Figure 6B:
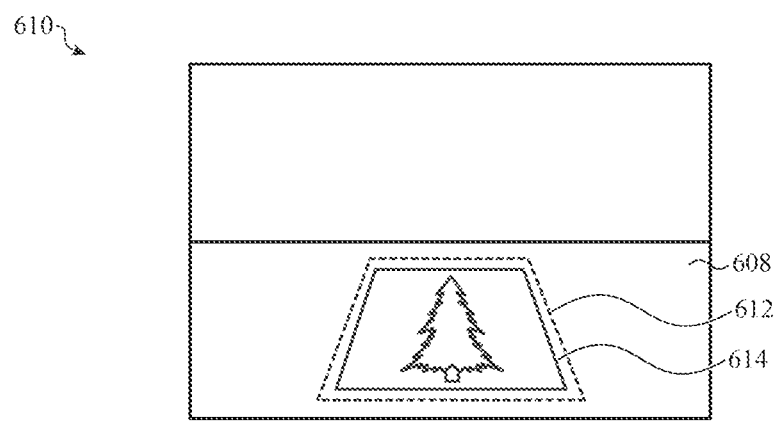
FIG. 6B shows an example image captured by the camera of FIG. 6A.

In other instances, it may be desirable to use the camera of a device to generate output images directed to a surface (e.g., a surface of a table, counter, desk or the like) or an object positioned on a surface that is identified in a scene surrounding the camera. For example, FIG. 6A shows a system 600 that includes a device 602 with a camera 604 (not shown in FIG. 6A) having a field of view 606. The device 602 may be positioned relative to a surface 608, such that a portion of the surface 608 is positioned within the field of view 606 of the camera 604. FIG. 6B shows an example image 610 captured by the camera 604 when the device 602 is positioned as depicted n FIG. 6A. A portion of the surface 608 that is captured in the image 610 may be used in generating an output image as discussed above.

Figure 6C:
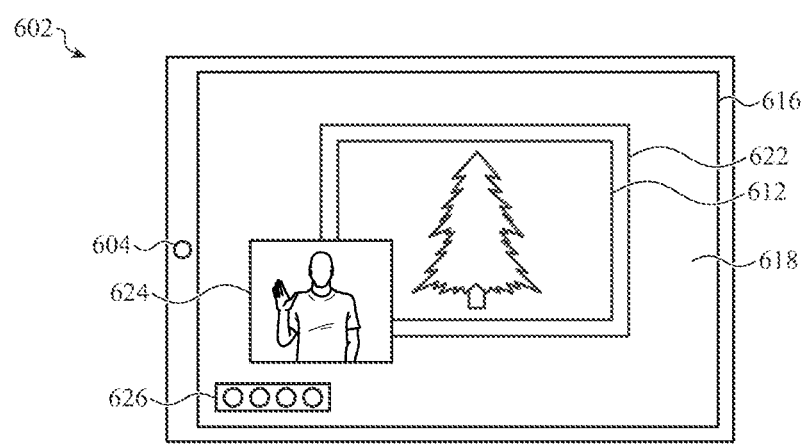
FIG. 6C shows a front view of the device of FIG. 6A.

For example, in the variation shown in FIGS. 6A and 6B, a piece of paper 612 may be positioned on the surface 608, and a cropping boundary 614 is used to select a portion of the surface 608 that includes the piece of paper 612 for use in generating output images. These output images may be used to facilitate a video conferencing session as illustrated in FIG. 6C. Specifically, 6C shows a front view of the device 602, which in this variation includes camera 604 and a display 616 that displays a communication user interface 618. The communication user interface 618 includes a first video feed 622 and a second video feed 624. The first video feed 622 is a representation of an image stream captured by the camera 604, while the second video feed 624 is a representation of image data captured by a camera from a second device (not shown) that is communicated from the second device to device 414 during the video conferencing session. The first video feed 422 may be transmitted from device 414 to the second device during the video conferencing session to allow the first video feed 422 to be displayed from the second device.

A cropped portion of the camera's field of view corresponding to the cropping boundary 614 is used to generate the output images that form the first video feed 622, which includes the piece of paper 612 in the variation shown in FIG. 6C. In some instances the cropping boundary 614 may have a non-rectangular shape (though a rectangular shape may be used if so desired), and the image data associated with the cropping boundary 614 may be modified to generate an output image having a rectangular shape (e.g., to correct for perspective distortions resulting from the relative position between the camera 604 and the surface 608). Also shown in FIG. 6C is a set of optional controls 626 that may be displayed in the communication user interface 618, which may be used (e.g., via corresponding user inputs to a touch-sensitive surface of the display) to control one or more aspects of the videoconferencing session such as discussed previously.

Generating the first video feed 622 from a portion of a surface 608 may be one example of a number of different imaging modes that a user may select during a videoconferencing session. For example, the system 600 may detect a user input (e.g., via an input to one of the controls 626, a keyboard input, a gesture, an audio input, or the like) to change the video conferencing session to a surface-focus mode. While the video conferencing session is in the surface-focus mode, the first video feed is generated using captured images (or a cropped portion thereof) that include a portion of the surface 608.

The ability of the camera 604 to image the surface 608 depends at least in part on the relative orientation and positioning between the camera 604 and the surface 608. For example, in some instances the system 600 further comprises an accessory device 630 that may hold the device 602 and camera 604 in a particular orientation. The accessory device 630 may be positioned in a fixed relationship relative to the surface 608, and may thereby hold the device 602 and camera 604 in a particular orientation relative to the surface 608. For example, in the variation shown in FIG. 6A, a portion of the accessory device 630 may be placed directly on the surface 608 to set a relative position between the accessory device 630 and the surface 608.

The accessory device 630 may be any device capable of holding the device 602 and camera 604 in a particular orientation (or one of a number of possible orientations). In some examples, the accessory device 630 includes a foldable cover that can be folded into a support structure (e.g., having a triangular shape). The support structure, when placed on a surface, may hold the device 602 at a predetermined angle relative to that surface. In other instances, a laptop or computer monitor may act as the accessory device 630. As an example, the device 602 may be temporarily attached to an upper housing portion of a laptop (e.g., the portion that supports a display of the laptop), and a lower housing portion of the laptop (which may include a touchpad, keyboard, or the like and is connected to the upper housing portion via a hinge) may be placed on a surface. The angle between the upper housing portion and the lower housing portion may set the relative orientation and positioning between the device 602 and the surface 608, and thereby set the relative orientation and positioning between the camera 604 and the surface 608.

In the variation shown in FIG. 6A, the accessory device 630 is configured as a folio that may be adjusted to hold the device 602 in any of multiple different positions and orientations relative to a surface. In this variation, the accessory device 630 includes a base segment 632 that may be on the surface 608 to set the relative position between the accessory device 630 and the surface 608. The base segment 632, which in some instances may include a keyboard, touchpad, or the like, is rotatably coupled to a second segment 634 via a first hinge assembly 636. The second segment 634 is rotatably coupled to a third segment 638 via a second hinge assembly 640. The device 602 may be temporarily secured to the third segment 638 (e.g., via magnets, mechanical fasteners, or the like). The second segment 634 and third segment 638 suspend the device 602 relative to the base segment 632 and the surface 608. Specifically, the angle between the base segment 632 and the second segment 634 controls the distance between the device 602 and the surface 608, while the angle between the second segment 634 and the third segment 638 controls the angle of a front surface the device 602 relative to the surface 608. In this way, a user may adjust either or both of the height and angle of the device 602 relative to the surface 608.

Figure 6D:
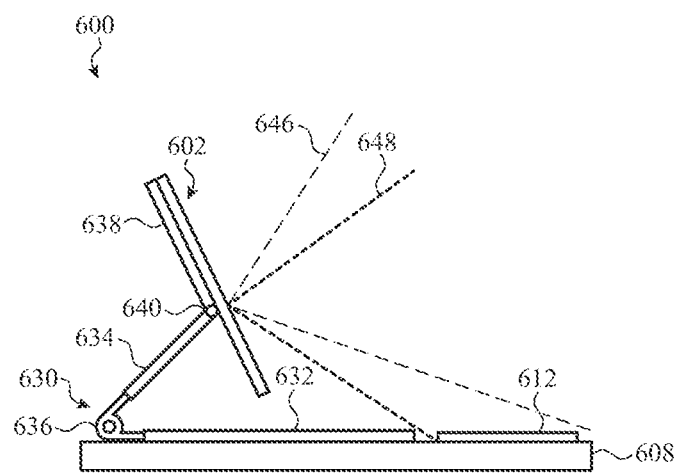

For example, in FIG. 6A the system 600 is shown such that the device 602 is positioned with a front surface of the device 602 positioned perpendicular to surface 608. FIG. 6D shows the same system as FIG. 6A, except that the third segment 638 of the accessory device 630 has been rotated to change the relative angle between the device 602 and the surface 608. Specifically, the front surface of the device 602 has been rotated to face away from the surface 608. If the field of view of the camera 604 of the device 602 were to keep the same lateral position 646 (shown in phantom in FIG. 6D) as the default field of view 606 depicted in FIG. 6A, the surface 608 and piece of paper 612 would no longer be positioned in the camera's field of view (and thus wouldn't be present in images captured by the camera 604). In these instances, the field of view of camera 604 may be moved to a second lateral position 648 as discussed above to maintain the surface 608 and piece of paper 612 in the camera's field of view. In this way, even though the device 602 and camera 604 have been rotated away from the surface 608, the camera 604 may still capture images similar to image 610 of FIG. 6B.

Accordingly, the systems, devices, and methods described herein may be used to image a portion of a surface. In some instances, an object on a surface (such as the piece of paper 612 described previously) may be selected as a target object, and the object-based techniques described above with respect to FIGS. 4A-5 may be used to adjust the default field of view based on a position of the target object. This may facilitate generating output images that include the target object, even as a user moves the target object relative to the surface.

In other instances, it may be desirable to set a lateral position of the default field of view based at least in part on the orientation of the camera. This may allow the device to image a fixed region of space (e.g., a particular portion of a surface) over a range of possible device orientations. For example, during a video conferencing session as discussed above, a user may wish to switch from an object-focus mode (e.g., when the field of view is adjusted based on a position of an object within the field of view, such as discussed above with respect to FIGS. 4A-5) to a surface-focus mode to image a portion of a surface as discussed above. In these instances, using orientation information associated with the camera to set a lateral position of the default field of view may allow the camera to image the surface across a range of orientations. This gives a user the flexibility to switch between these videoconferencing modes without needing to reorient or reposition the camera.

Figure 7:
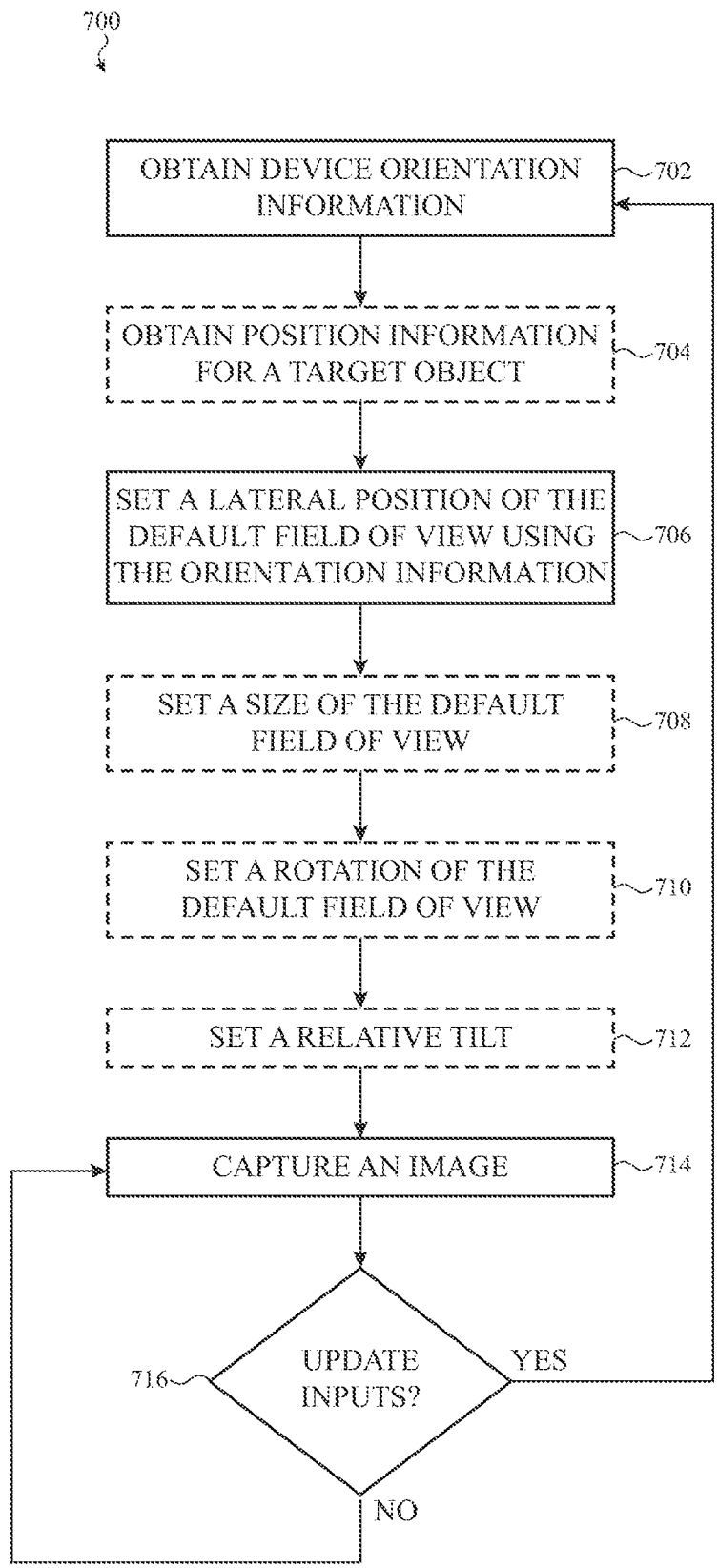
FIG. 7 depicts a method of setting a lateral position of a camera's field of view using orientation information associated with the camera.

FIG. 7 shows a flowchart that represents an example method 700 that a position control logic may utilize to select the default field of view for a camera of a device. Specifically, the position control logic may be configured to obtain orientation information associated with a camera at step 702. This orientation information can include absolute orientation information (i.e., orientation of the camera relative to gravity) or a relative orientation information (e.g., orientation of the camera relative to another object), and can be measured in any suitable manner.

For example, when the orientation information includes absolute orientation information, the orientation of the camera relative to gravity may be calculated using one or more sensors such as accelerometers, gyroscopes, combinations thereof, or the like. In some instances, the camera may include one or more sensors that provide absolute orientation information. Additionally or alternatively, a device incorporating the camera may include one or more sensors that provide absolute orientation information of the device. Because the relative position and orientation of the camera within a device is known, orientation information of the device may be used to calculate (or otherwise used in place of) orientation information of the camera.

In some instances, relative orientation information may include the relative positioning of the camera relative to another object. This may include a relative angle between the camera and the object (e.g., an angle between the optical axis of the camera and a target surface of the object), and in some instances a distance between the camera and the object. In some of these variations, the relative orientation information includes the relative orientation between the camera and a target surface. For example, depth information from a depth sensor or images from a camera may be analyzed to detect the relative angle and/or distance between the camera and the plane.

Additionally or alternatively, when the device incorporating the camera is coupled (e.g., releasably coupled) to an accessory device, the relative orientation information includes the relative orientation between the camera and a target portion of the accessory device. In some instances, the device incorporating the camera is configured to communicate with the accessory device (e.g., via an electrical connector or the like), and receives information about a current configuration of the accessory device therefrom. In some of these variations, the accessory device may include one or more sensors (such as an accelerometer, directional sensor, gyroscope, and/or motion sensor as discussed above), that may be used to determine the orientation of the accessory device (or relative orientation of components of the accessory device). For example, in the example of the accessory device 630 shown in FIGS. 6A and 6D, the accessory device 630 may be able to communicate the relative positions of the base segment 632, second segment 635, and third segment 638 to the device 602, which may be used to calculate the relative angle and distance between the camera 604 and the base portion 632. As another example, in an instance where the accessory device is a laptop or monitor, the accessory may include one or more sensors that can determine a relative angle between a screen (or a portion of the accessory device housing the screen) and a base of the accessory device.

Additionally or alternatively, depth information from a depth sensor or images from a camera may be analyzed to detect a portion of the accessory device, and may use that information to determine relative orientation information between the camera and the accessory device. For example, when the device 602 described with respect to FIGS. 6A-6D is positioned as shown in FIG. 6A, some of the base portion 632 is positioned within the field of view 606 of the camera 604. By analyzing the amount and shape (e.g., how much distortion is present) of the base portion 632 is present in images captured by the camera 604, the position control logic may determine a relative angle and/or distance between the camera and the base portion 632.

At step 706, the position control logic is configured to set a lateral position of the default field of view of the camera using the orientation information associated with the camera. If the lateral position of the default field of view set at step 706 is different than the current default field of view, the camera will laterally shift the field of view of the camera (e.g., via relative movement of a lens and image sensor of the camera as discussed previously) to the new lateral position. Any of the orientation information described above may be used to set the default field of view of the camera.

For example, in some instances the lateral position of the default field of view of the camera is set using absolute position information of the camera. In these instances, the lateral position of the default field of view may vary as a function of an angle of the camera (e.g., the optical axis of the camera) relative to gravity. If the camera rotates to change orientations, the default field of view may be shifted in a direction opposite of the direction of rotation. This may allow a user to place the camera in any of a number of different orientations, and the default field of view will be selected so that the same portion of a scene is in the camera's field of view regardless of the camera's orientation.

In other instances, the lateral position of the default field of view of the camera is set using relative orientation information between the camera and a surface that is present in the scene around the camera. This may include setting the position based on a relative angle and/or distance between the camera and the surface. As the camera is angled away from the surface, the default field of view may be shifted toward the surface (and vice versa) in order to keep a target portion of the surface in the camera's view. This may provide a consistent area on a surface in which a user places documents or other objects to be imaged by the camera. Using this relative orientation information may be advantageous in situations where the camera is being used on a non-level surface.

In still other instances, the lateral position of the default field of view of the camera is set using relative orientation information between the camera and a target portion of an accessory device. For example, the accessory device may have a portion thereof that falls in the camera's field of view for certain camera orientations (e.g., base portion 632 of the accessory device 630 of FIG. 6A). In these instances, it may be desirable to set the default field of view such that the accessory device is not positioned in the field of view (or such that a predetermined amount of the accessory device is present in the field of view). This may reduce the amount of the camera's field of view taken up by the accessory device, thereby allowing more of the field of view to be dedicated to imaging other portions of the scene.

It should be appreciated that the lateral position of the default field of view may be set using multiple types of orientation information (e.g., different combinations of absolute and relative orientation information as discussed above), and that the position control logic may utilize a different type of orientation information at different times. Additionally, in some instances the position control logic may be configured to set a lateral position of the default information using both orientation information associated with the camera and position information of a target object.

Figure 8A:
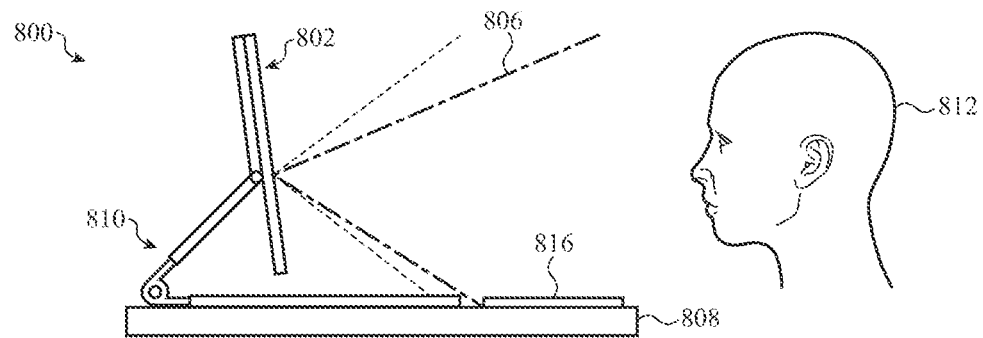
FIG. 8A shows a side view of a variation of a system as described herein, including a device that has a camera with an adjustable field of view.
Figure 8B:
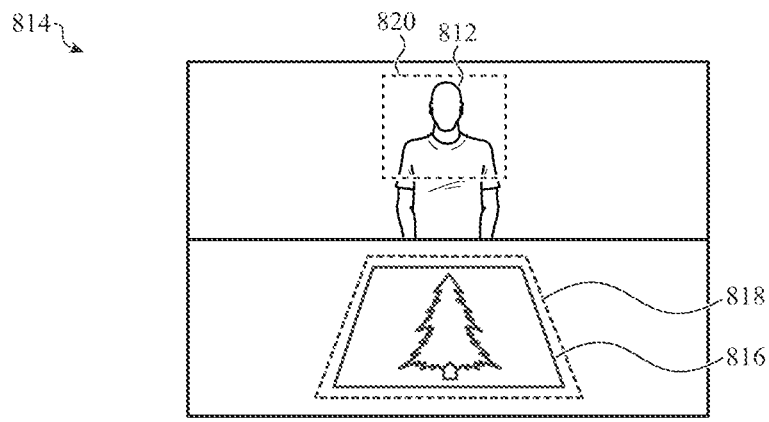
FIG. 8B shows an example image captured by the camera of FIG. 8A.

For example, during a video conferencing session, instead of selecting either an object-focus mode or a surface-focus mode, a user may opt for a hybrid-focus mode in which a device captures images that include both a target object and a target surface. FIG. 8A shows an example of a system 800 that may facilitate a hybrid-focus mode. The system 800 includes a device 802 that includes a camera 804 (not shown in FIG. 8A) having an adjustable field of view 806 as discussed above. The device 802 may be positioned relative to a surface 808 (e.g., using an accessory device 810 such as those discussed above), such that a portion of the surface 808 is positioned within the field of view 806 of the camera 804. In these instances, a person 812 may also be positioned in the field of view 806 of the camera 804. Accordingly, images captured by the camera 804 may include both the person 812 and the surface 808, as illustrated in FIG. 8B by an example image 814 captured by the camera 804 when the device 802 is positioned as shown in FIG. 8A.

Figure 8C:
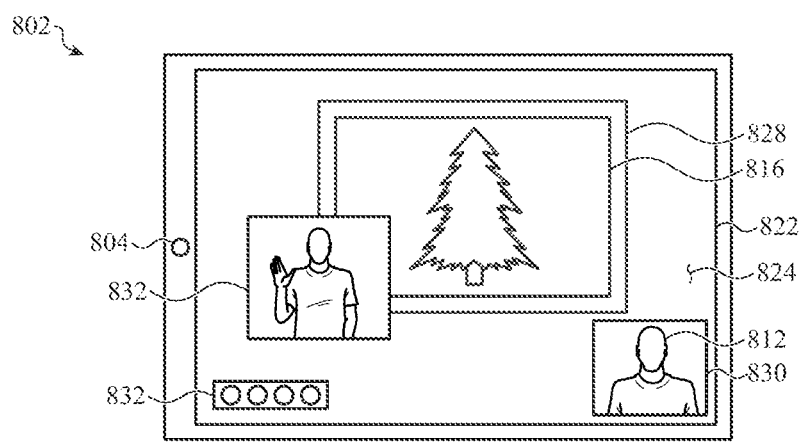
FIG. 8C shows a front view of the device of FIG. 8A.

These images may be used to generate one or more video streams. For example, in the variation shown in FIGS. 8A and 8B, a piece of paper 816 may be positioned on the surface 808, and a first cropping boundary 818 is used to select a portion of the surface 808 that includes the piece of paper 816 for use in generating a first set of output images. A second cropping boundary 820 is used to select another portion of the camera's field of view associated with the person 812 for use in generating a second set of output images. These sets of output images may be used to facilitate a video conferencing session as illustrated in FIG. 8C. Specifically, FIG. 8C shows a front view of the device 802, which in this variation includes the camera 804 and a display 822 that displays a communication user interface 824.

The communication user interface 824 includes a first video feed 828, a second video feed 830, and a third video feed 832. The first and second video feeds 828 and 830 are representations of an image stream captured by the camera 804. Specifically, the first video feed 828 corresponds to the first bounding box 818, and includes output images that are generated to include the portion of the surface 808 including the piece of paper 816. The second video feed 830 corresponds to the second bounding box 820, and includes output images that are generated to include the person 812. The third video feed 832 is a representation of image data captured by a camera from a second device (not shown) that is communicated from the second device to device 802 during the video conferencing session. The first and second video feeds 828 and 830 may be transmitted from device 802 to the second device during the video conferencing session to allow the first and second video feeds 828 and 830 to be displayed from the second device.

Returning to FIG. 7, in these instances the method may optionally include obtaining position information for a target object at step 704. The selection of a target object and determination of position information of the target object may be performed in any manner as described above with respect to the method 500 of FIG. 5. In these embodiments, setting the lateral position of the default field of view using orientation information associated with the camera at step 706 also includes setting the lateral position of the default field of view using the position information for the target object.

In some of these variations, the position control logic may determine potential lateral positions for the default field of view using the orientation information associated with the camera, and the position control logic may use the object position information to select one of these potential lateral positions and set the default field of view to this selected lateral position. This may allow the field of view to move to accommodate movement of an object (such as the person 812 in FIGS. 8A-8C) using the techniques discussed above with respect to FIGS. 4A-5, but the system will constrain this movement to a set of positions that will not interfere with capturing another portion of a scene (such as the piece of paper 816 in FIGS. 8A-8C).

This may be useful in instances where the image stream is used for a hybrid-focus mode in a video conferencing session as discussed above, as well as in instances where a user is switching between modes. For example, a user may switch between an object-focus mode (during which the position control logic may set a lateral position of the default field of view using position information for a target object), a surface-focus mode (during which the position control logic may set the lateral position based on camera orientation information), and a hybrid-focus mode (during which the control logic may set the lateral position based on both camera orientation information and position information for a target object).

In some instances, the position control logic is optionally configured to set a size of the default field of view at step 708. The size of the default field of view may be set using the camera orientation information, using the position information of the target object (to the extent that information is obtained at step 704), combinations thereof, or the like. If the camera has optical zoom capabilities, the focal length of the camera may be updated to change the size of the default field of view. The position control logic may be configured to change the size of the default field of view based on the proximity of the camera to an object or a surface, such as increasing the size of the default field of view as the distance between the camera and the object or surface decreases. In other instances, the position control logic may be configured to change the size of the default field of view based on the location of a target object, as discussed above.

Additionally or alternatively, the position control logic may also optionally set a rotation of the field of view using the camera orientation information at step 710. For example, if a device (or an accessory device holding the device) is not placed flat on a surface (e.g., one side of the device is propped up on another object to angle the device relative to the surface), images captured by the camera may be rotated as such as shown in FIG. 2E. In these instances, the orientation information of the camera may be used to identify that the camera is angled relative to the surface, and the image sensor may be rotated around the camera's optical axis to correct for this misalignment.

Figure 9A:
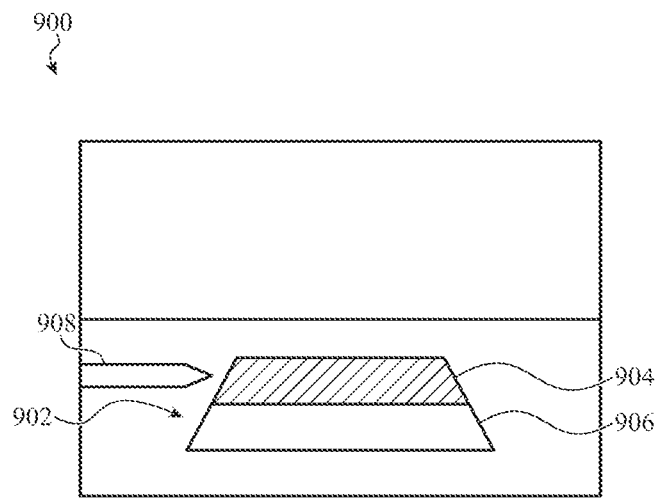
FIGS. 9A and 9B show example images captured by a variation of the systems described herein.
Figure 9B:
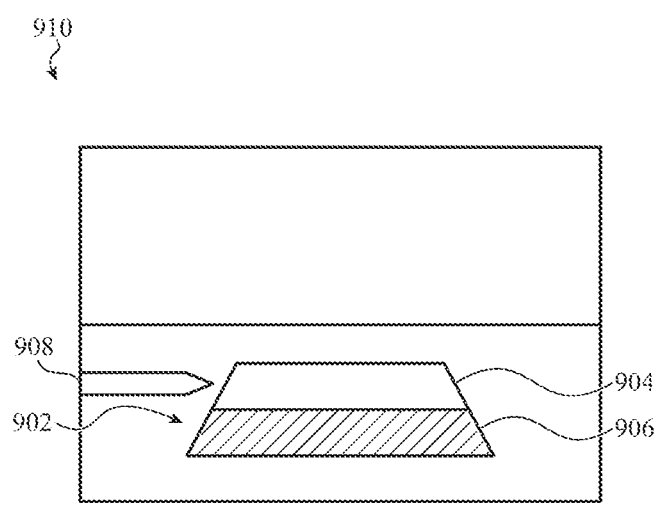

Additionally or alternatively, the position control logic may also optionally set a relative tilt between the image sensor and the lens at step 712. This allows the camera to adjust the focal plane of the camera as discussed above. This tilt may be set using the camera orientation information, using the position information of the target object (to the extent that information is obtained at step 704), combinations thereof, or the like. In some instances, the tilt may be based on user input to selectively adjust the focus of a portion of the scene. For example, FIGS. 9A and 9B show a first image 900 and a second image 910, respectively, captured by a camera that can create a relative tilt between the image sensor and the lens (such as camera 200 discussed above). Depending on the design of the camera and the relative position and dimensions of the objects being imaged, an object such as a piece of paper 902 may be positioned in the camera's field of view such only a portion of the object can be in focus at a given time. For example, in FIG. 9A, a first portion 904 of the piece of paper 902 may be out of focus (as illustrated with hatching) while a second portion 906 of the piece of paper 902 is in focus.

A user may indicate a desire to change the focus to bring the first portion in focus by providing an input to the system. For example, in FIG. 9A a stylus 908 or other object (such as a user's finger) may be placed in the camera's field of view, and a location of the stylus 908 may be used to indicate a portion of the piece of paper 902 that the user wants in focus. Alternatively, a user may select a portion of a live preview or video stream via corresponding user inputs to a touch-sensitive surface of the display to select this portion of the paper 902. The system may then adjust the relative tilt between the lens and image sensor of the camera to place the first portion 904 of the piece of paper 902 in focus, as depicted in FIG. 9B.

Once the default field of view (and relative tilt in instances where the method performs step 712) has been updated (and the camera has performed any actuation necessary to move the field of view to the selected default field of view), the camera captures an image at step 714. The camera may continue capturing images until one or more of the inputs to the position control logic are updated (at step 716) at which point a new iteration of the method 700 may be started again at step 700. These updates may occur after each image capture, or may be performed periodically such that multiple images are captured by the camera before the inputs to the position control logic are updated. Accordingly the camera may capture an image stream with a default field of view that dynamically updates as the object moves.

This captured image stream may be used (either by the device that includes the camera or another device that receives the captured image stream therefrom) to generate one or more output images as discussed in more detail above. In some instances, one or more cropping boundaries may be applied to the captured image stream to set a boundary of one or more sets of output images, such as described above with respect to FIGS. 8A-8C.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

What is claimed is:

1. A system comprising:
    a device comprising a camera, the camera having an optical axis and an adjustable field of view, wherein the camera comprises:
    a lens;
    an image sensor; and
    a position control logic configured to:
       obtain camera orientation information associated with the camera;
       select a lateral position of a default field of view using the camera orientation information;
       control a relative position of the lens and the image sensor to maintain the adjustable field of view as the default field of view while the camera is stationary; and
       capture an image at the default field of view.

2. The system of claim 1, further comprising an accessory device coupled to the device, and wherein the camera orientation information comprises relative orientation information that includes a relative orientation between the camera and the accessory device.

3. The system of claim 1, wherein the camera orientation information comprises relative orientation information that includes a relative orientation between the camera and a surface identified in a scene surrounding the camera.

4. The system of claim 1, wherein the camera orientation information comprises absolute orientation information that includes a relative orientation between the camera and gravity.

5. The system of claim 1, wherein the position control logic is configured to perform optical image stabilization while the camera is moving, during which the position control logic temporarily moves the adjustable field of view away from the default field of view in response to camera motion.

6. The system of claim 1, wherein:
    the position control logic is configured to obtain position information associated with a target object; and
    the position control logic is configured to select the lateral position of the default field of view using the camera orientation information and the position information.

7. The system of claim 6, wherein:
    the position control logic is configured to identify a set of potential lateral positions using the camera orientation information and to select, using the position information, one of the set of potential lateral positions as the lateral position of the default field of view.

8. The system of claim 1, wherein the position control logic is configured to set a size of the default field of view.

9. The system of claim 1, wherein:
the position control logic is configured to control a relative rotation of the image sensor around the optical axis by an amount determined using the camera orientation information.

10. A camera having an optical axis and an adjustable field of view, the camera comprising:
a lens;
an image sensor; and
a position control logic configured to:
obtain camera position information associated with a target object;
select a lateral position of a default field of view using the camera position information;
control a relative position of the lens and the image sensor to maintain the adjustable field of view as the default field of view while the camera is stationary; and
capture an image at the default field of view.

11. The camera of claim 10, wherein the position control logic is configured to a relative tilt between the lens and the image sensor using the camera position information.

12. The camera of claim 10, wherein selecting the lateral position of the default field of view comprises:
determining whether a set of candidate positions exists that would position the target object in a first region of the adjustable field of view.

13. The camera of claim 12, wherein selecting the lateral position of the default field of view comprises:
selecting, in response to determining that the set of candidate positions exists, one of the set of candidate positions as the lateral position of the default field of view.

14. The camera of claim 12, wherein selecting the lateral position of the default field of view comprises:
selecting, in response to determining that the set of candidate positions does not exist, the lateral position of the default field of view at a position that places the target object in a second region of the adjustable field of view.

15. A method comprising:
at a system that includes a display and a camera having an adjustable field of view:
capturing a first image stream while the adjustable field of view has a default field of view set at a first lateral position; and
generating a first set of output images from the first image stream, wherein:
a relative position of a lens and an image sensor of the camera is controlled to maintain the adjustable field of view as the default field of view; and
the first lateral position is selected using camera orientation information associated with the camera.

16. The method of claim 15, wherein the first set of output images is a video feed, and further comprising:
displaying, via the display, a communication user interface for a videoconferencing session, the communication user interface including the video feed.

17. The method of claim 16, wherein the video feed includes a representation of a surface in a scene surrounding the camera.

18. The method of claim 15, further comprising:
capturing a second image stream while the adjustable field of view has the default field of view set at a second lateral position; and
generating a second set of output images from the second image stream, wherein:
the second lateral position is selected using position information associated with a target object.

19. The method of claim 15, wherein:
the first lateral position is selected using both the camera orientation information and position information associated with a target object.

20. The method of claim 19, further comprising:
generating a second set of output images from the first image stream, wherein:
the first set of output images is generated from a first cropping boundary applied to the first image stream; and
the second set of output images is generated from a second cropping boundary applied to the first image stream.

* * * * *